April 10, 1956　　　　　M. MAUL　　　　　2,741,431
RECORD CARD CONTROLLED CALCULATING MACHINE
Filed April 16, 1952　　　　　　　　　　16 Sheets-Sheet 1

Inventor:
Michael Maul,
BY
Atty.

April 10, 1956   M. MAUL   2,741,431
RECORD CARD CONTROLLED CALCULATING MACHINE
Filed April 16, 1952   16 Sheets-Sheet 2

Inventor:
Michael Maul,
BY
Atty.

Inventor:
Michael Maul,

April 10, 1956   M. MAUL   2,741,431
RECORD CARD CONTROLLED CALCULATING MACHINE
Filed April 16, 1952   16 Sheets-Sheet 5
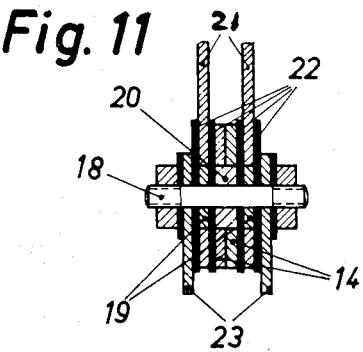
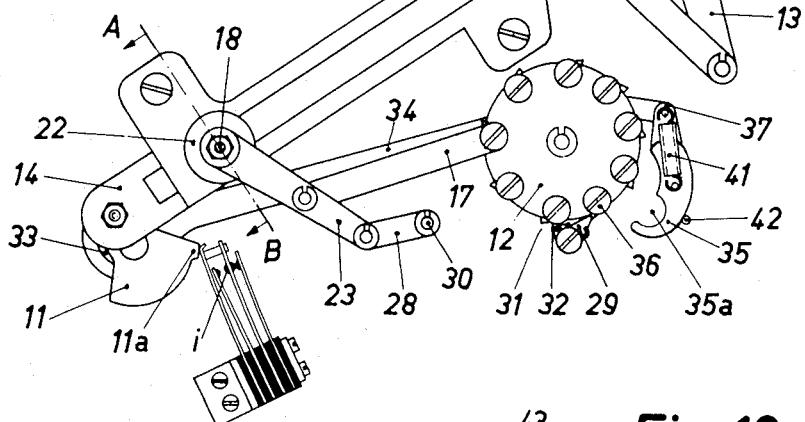
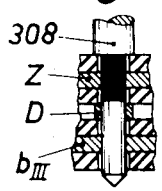
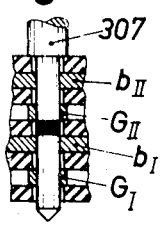
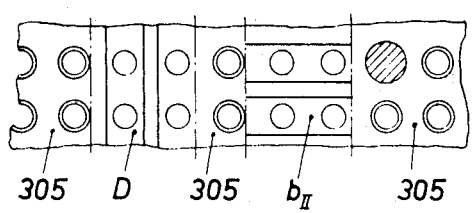
Inventor:
Michael Maul April 10, 1956     M. MAUL     2,741,431
RECORD CARD CONTROLLED CALCULATING MACHINE
Filed April 16, 1952     16 Sheets-Sheet 6
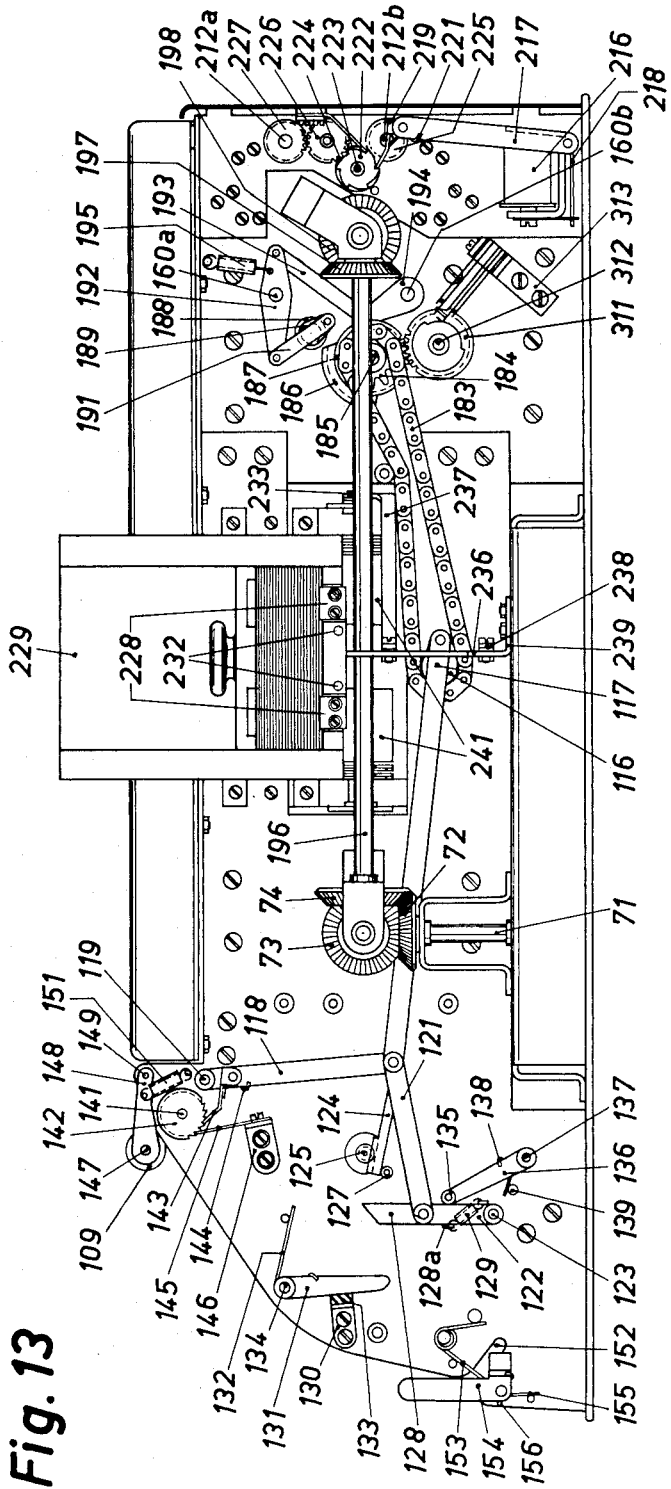
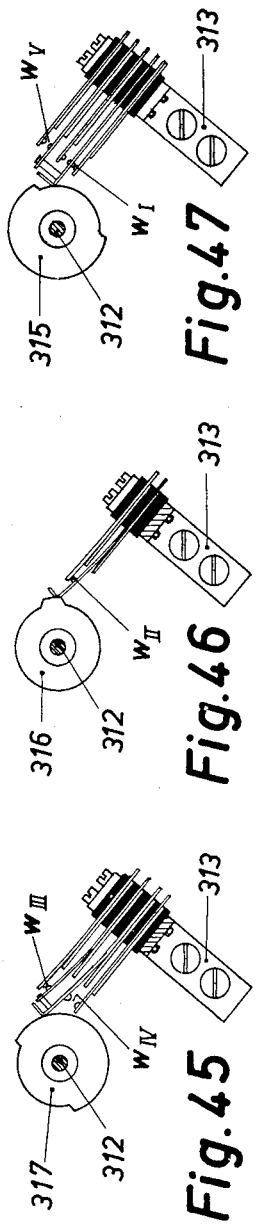
Inventor:
Michael Maul
BY *[signature]*
ATTY.

April 10, 1956  M. MAUL  2,741,431
RECORD CARD CONTROLLED CALCULATING MACHINE
Filed April 16, 1952  16 Sheets-Sheet 7
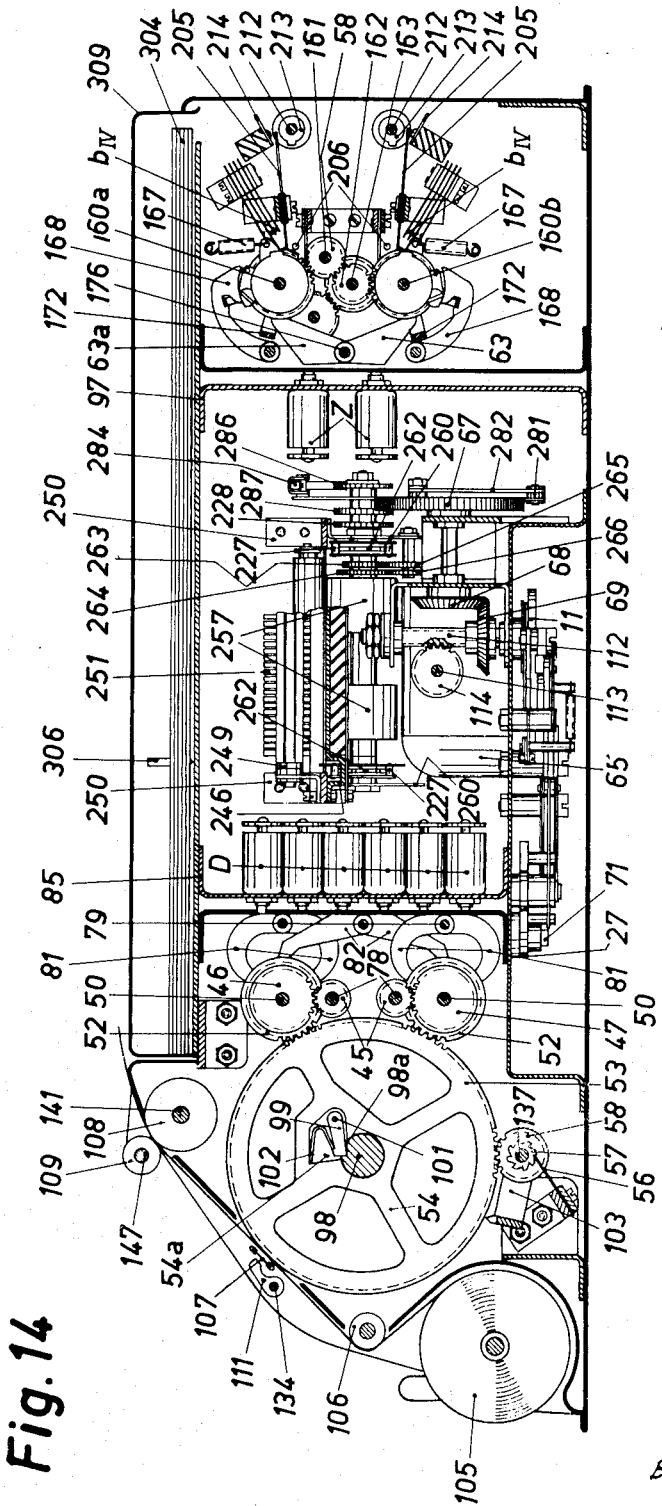
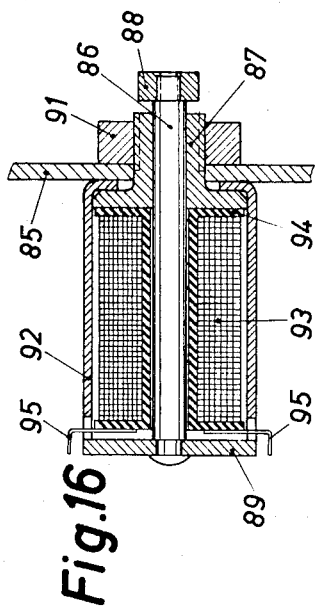
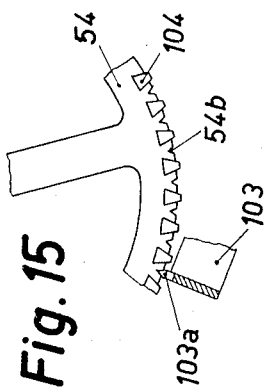
Inventor:
Michael Maul
ATTY.

April 10, 1956  M. MAUL  2,741,431
RECORD CARD CONTROLLED CALCULATING MACHINE
Filed April 16, 1952  16 Sheets-Sheet 8

Inventor:
Michael Maul,
by
Atty.

April 10, 1956 M. MAUL 2,741,431
RECORD CARD CONTROLLED CALCULATING MACHINE
Filed April 16, 1952 16 Sheets-Sheet 9
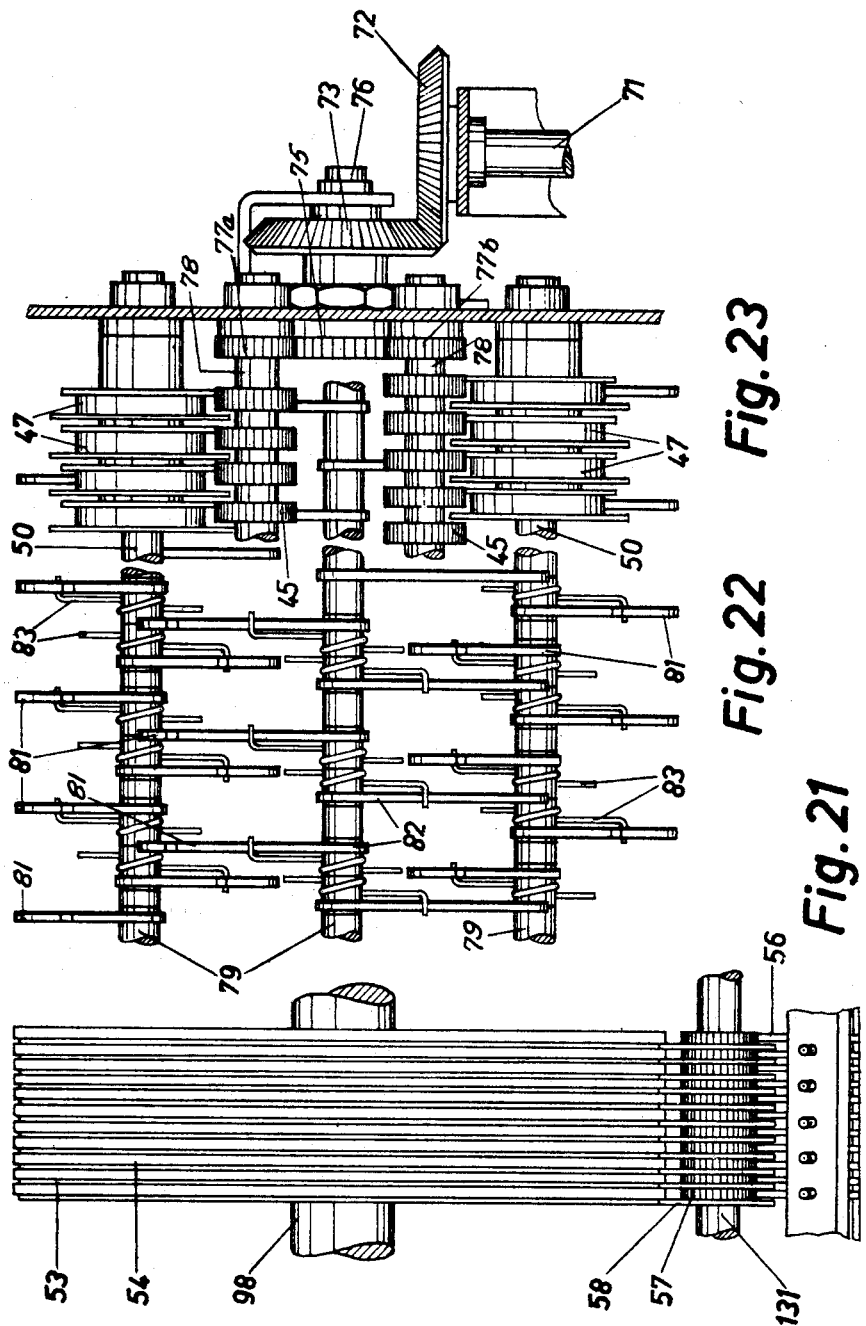
Inventor:
Michael Maul,
By 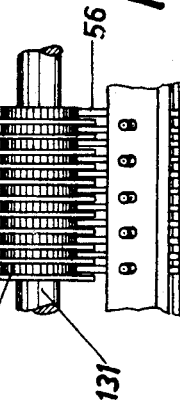
Atty.

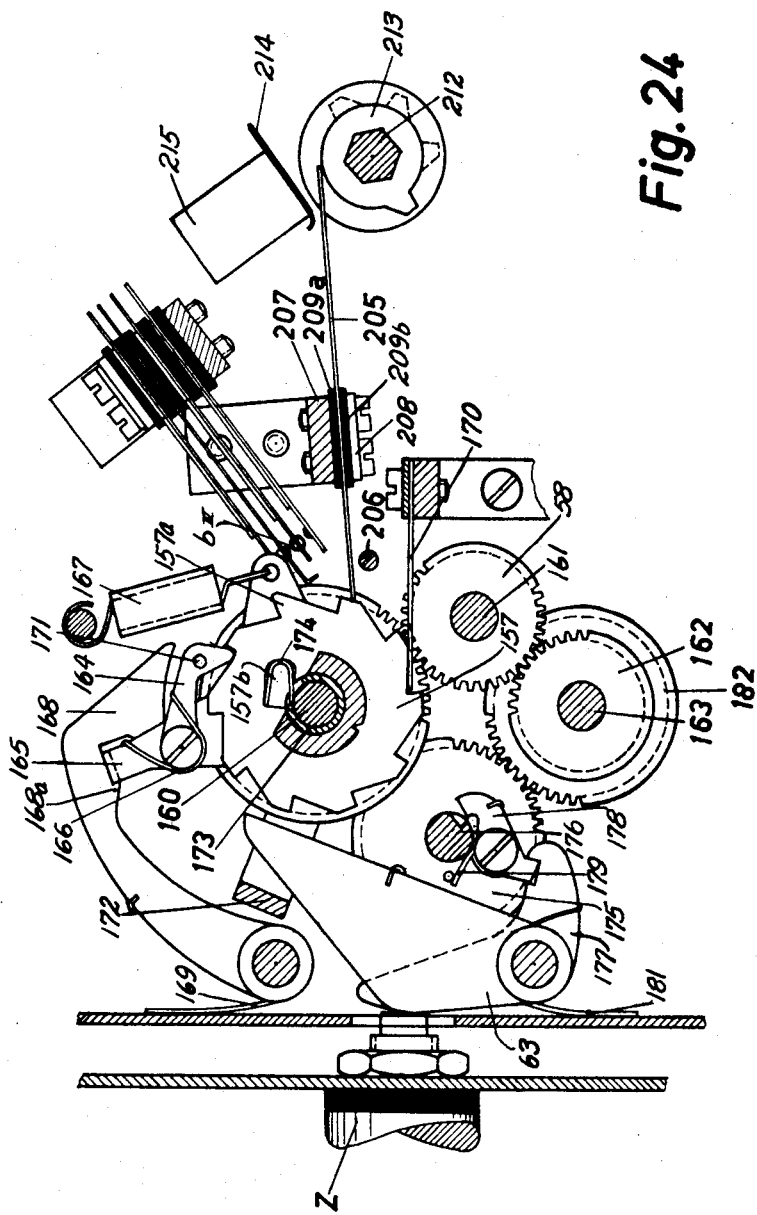

April 10, 1956 M. MAUL 2,741,431
RECORD CARD CONTROLLED CALCULATING MACHINE
Filed April 16, 1952 16 Sheets-Sheet 11
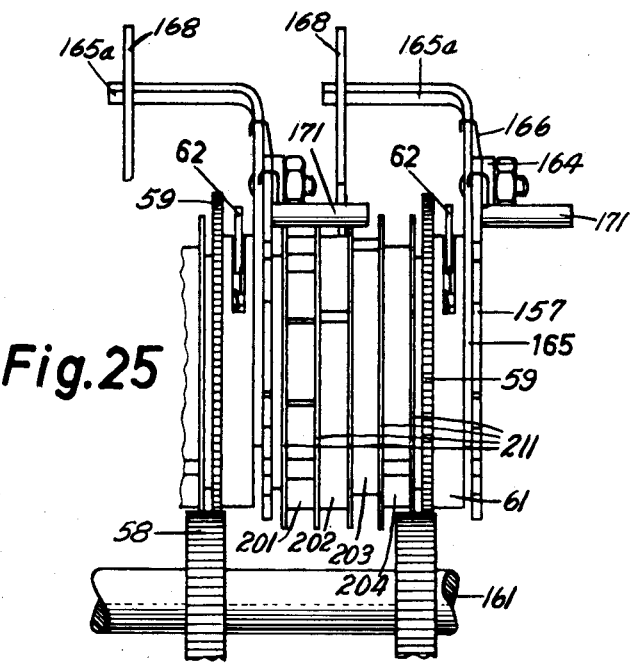
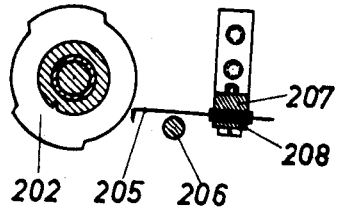
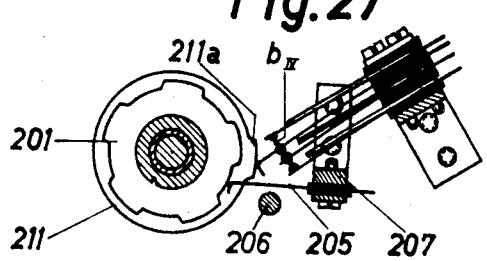
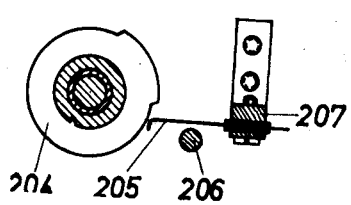
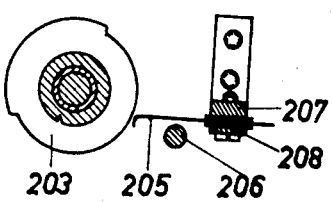
Inventor:
Michael Maul,
BY
ATTY.

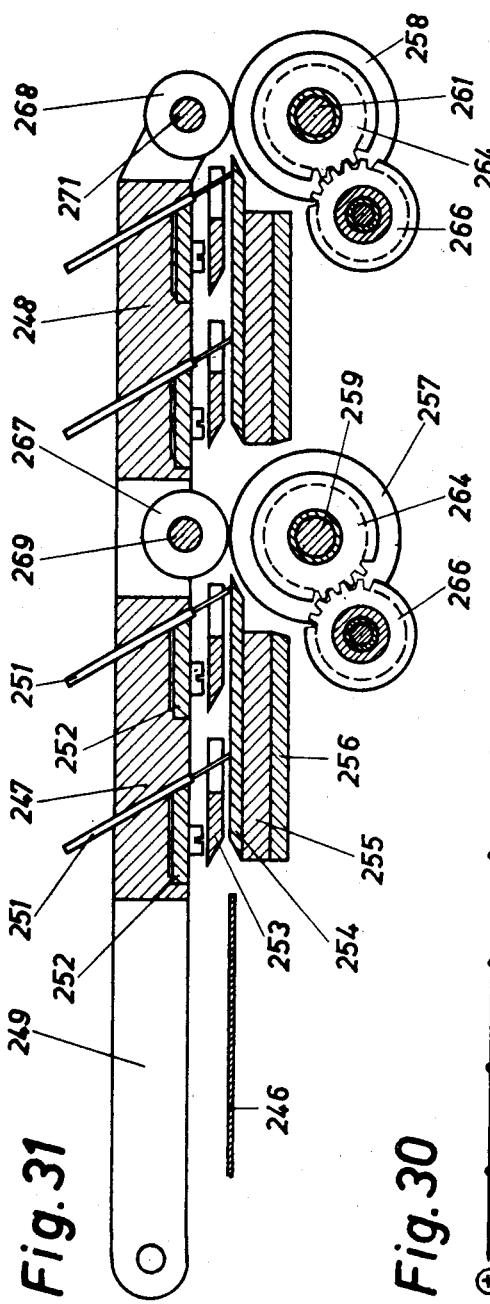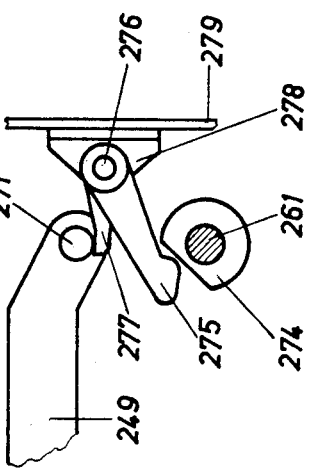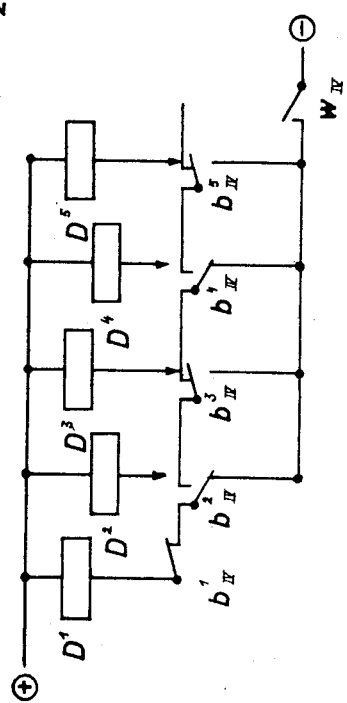

April 10, 1956
M. MAUL
2,741,431
RECORD CARD CONTROLLED CALCULATING MACHINE
Filed April 16, 1952
16 Sheets-Sheet 13
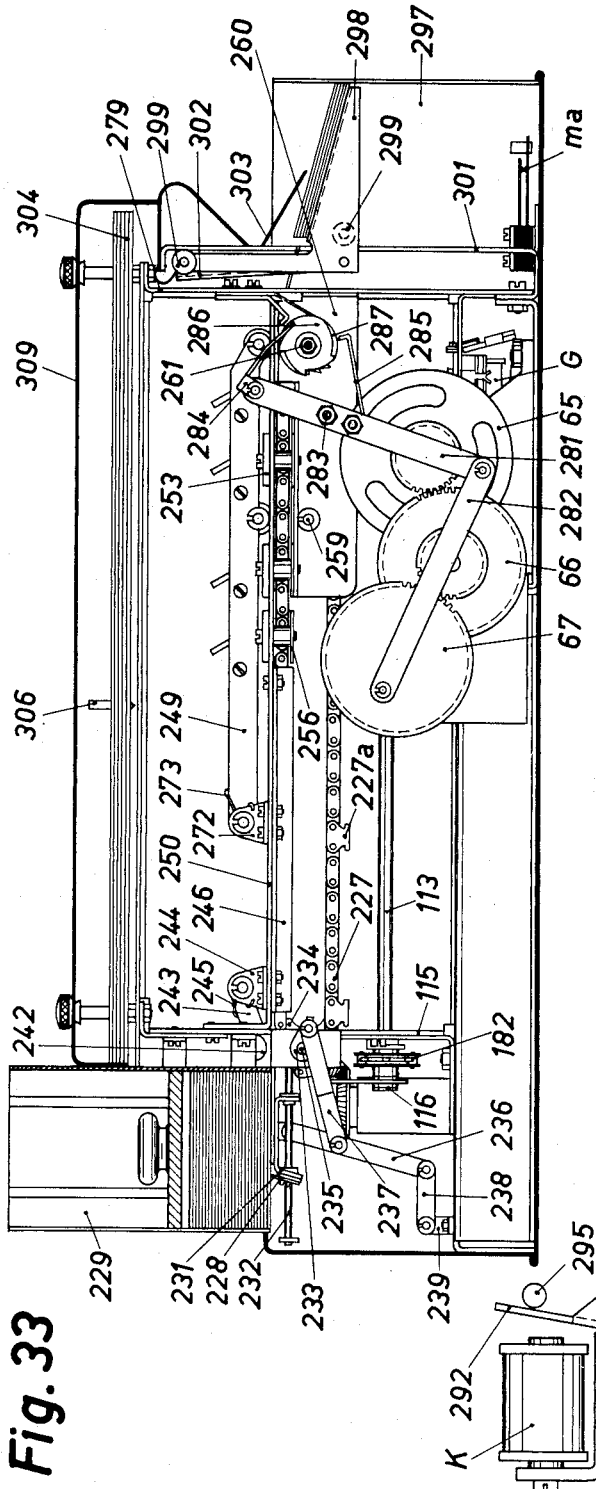
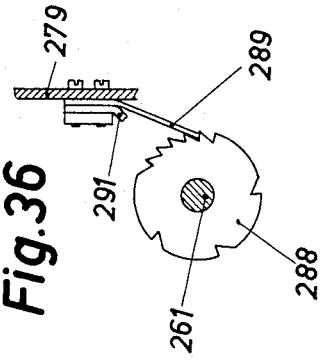
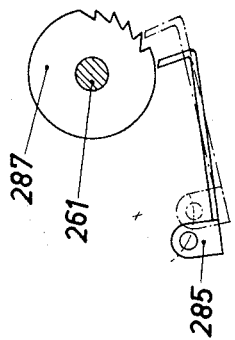
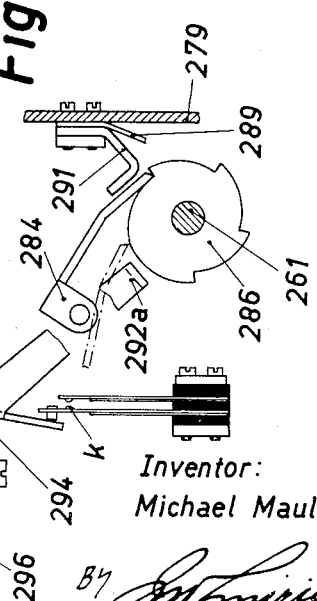
Inventor:
Michael Maul Inventor:
Michael Maul,

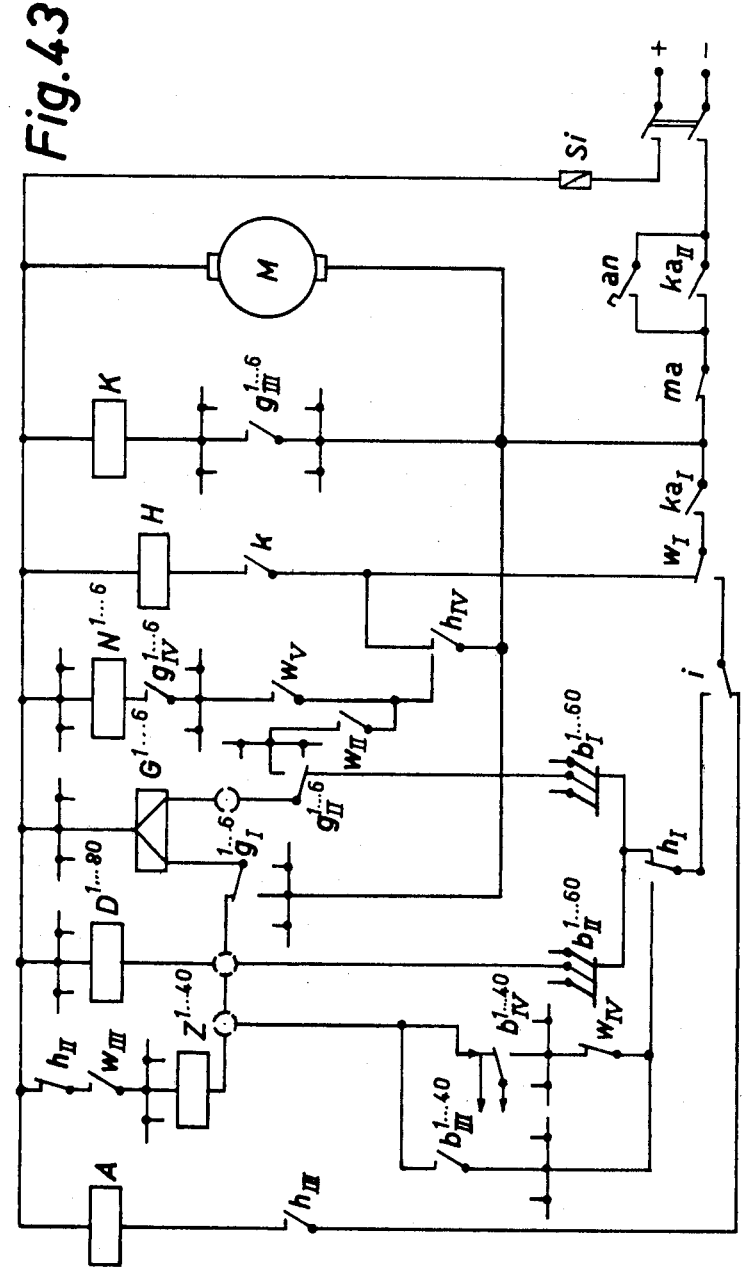

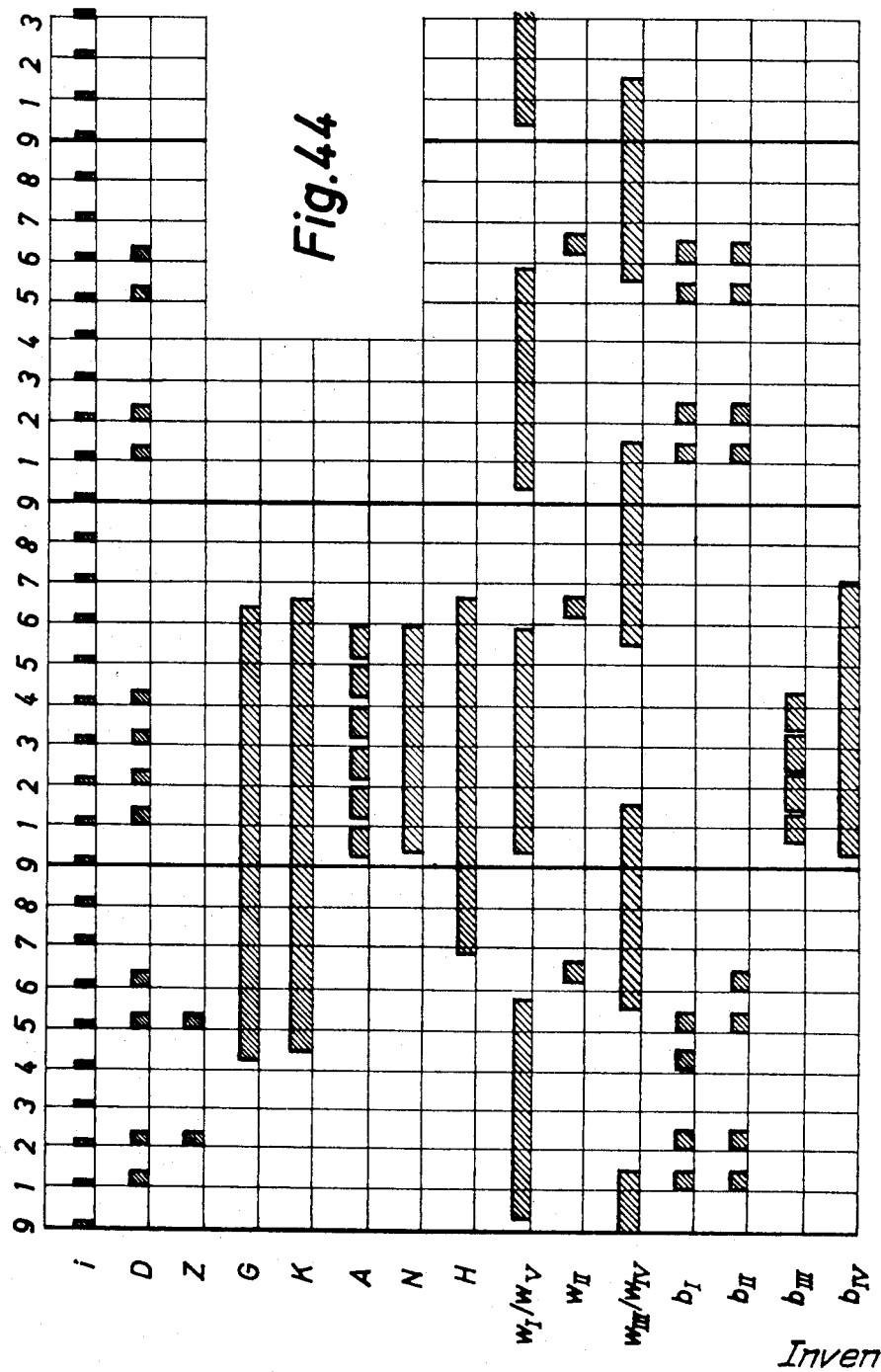

United States Patent Office 2,741,431
Patented Apr. 10, 1956

2,741,431

RECORD CARD CONTROLLED CALCULATING MACHINE

Michael Maul, Schwabach, near Nurnberg, Germany

Application April 16, 1952, Serial No. 282,721

Claims priority, application Germany April 27, 1951

20 Claims. (Cl. 235—61.9)

The present invention relates to a record card controlled machine preferably constructed as a punched card controlled machine which is particularly adapted for use with hole combinations. In punched card controlled machines the index markings in the record hole columns are formed by holes in predetermined index positions. Though generally the invention is applicable to any type of index marks and therefore is also applicable in the most general sense to record card controlled machines of any kind, for reasons of simplicity, in the following description only perforated record cards and perforated record card controlled machines are referred to.

In perforated record card controlled machines (particularly in tabulating machines) two methods have proved to be extraordinarily suitable for causing a controlling effect, particularly for the transfer of a value represented by a perforation.

In the one method, as it is particularly applied to the known Hollerith machines, the hole causes clutching of the registering mechanism to a continuously running drive moving synchronously with the card feed. Declutching takes place upon the passage of the zero-line of the column under the brushes. Accordingly, in this manner a distance corresponding to the distance of the hole from the zero-line and therewith a value corresponding to this distance is entered into the registering mechanism.

The other principle has been used for a long time in the so called Powers machines. In these all hole positions of a column are analyzed simultaneously by analyzing pins and the pin which has passed through a hole forms a stop for a reciprocating displaceable member. The distance travelled by the displaceable member is transferred to the registering mechanism, as, for instance, to the accumulator and to the printing device. This distance being identical with the distance of the hole from the zero-line, registering takes place according to the interpretation of the hole.

Now, in modern times the employment of hole combinations has become more and more important particularly because modern requirements also demand inclusion of the alphabetic characters in punched card controlled machinery. The representation of alphabetic and numerical characters (accordingly at least 36 characters) requires, however, the transition to hole combinational systems, if the card is not to assume extraordinarily large dimensions and if the paper consumption is not to be increased until the method becomes uneconomical.

It is now inherent in both of the above mentioned manners of operation that they cannot be used in cases where hole combinations proper are to be employed, i. e. hole combinations in which for a given number of characters the minimum of hole positions is used. This is due to the fact that they are based upon the so called single hole system, wherein the character is symbolically represented only by a single hole in the record card column while in the hole combinational system a plurality of holes must be used for many characters and wherein the relative position of the holes as well as the number of the same is of importance.

Now, in order to permit the evaluation of hole combinations various ways have already been chosen.

In view of the above mentioned drawbacks of the machines operating with translators, various suggestions have already been made for machines controlled by hole combinations which more or less could be termed "translatorless" machines. These machines almost generally proceed from the principle that to each hole position a certain value is associated and that the total of the values of the holes of a perforated column determines the interpretation of the character represented by the hole combination. The controlling impulse caused by the perforated positions are added so that the final result will become a controlling effect identical with the interpretation of the hole combination.

In the one group of these machines as for instance represented by the German Patent 530,003, each hole position has appropriated to it a drive to the registering mechanism through gearing. The driving gears of the individual positions have different numbers of teeth which become effective one after the other. For each hole position an individual clutch is required. A comparatively large number of driving wheels and clutch magnets is therefore necessary, particularly if this system is applied to alphabet printing.

When using an electrical step by step shifting mechanism, an electrical equivalent for the last mentioned embodiment is possible, the mechanism carrying out for each perforated position a number of shifting steps corresponding to the evaluation of the position. The German Patent 717,811 shows an example of such an arrangement. Since, however, in such devices the shift time interval per hole column must be so proportioned that for numerals and alphabet at least 36 steps can be carried out, it will result therefrom that such devices are limited with regard to their efficiency and speed of adjustment. In addition, the shift magnet being an operating magnet must be made sufficiently large and for this reason the numerous magnets require a large space.

In addition to the above mentioned arrangement also other arrangements have been suggested in which the usual drive of Hollerith machines is applied which requires a synchronous movement between the card and the drive for the accumulator or other registering means. A representative type of machines employing this method is for instance shown in U. S. Patent 2,439,445. This manner of operation, though applicable with a so called additional code, requires a particular sequence of the various values since a subsequent hole in the same column can only be analyzed if the amount corresponding to the value of the preceding hole has been entered into the accumulator. Therefore this system is not applicable to an arbitrary additional code and particularly it is not adaptable to the controlling of alphabet printing mechanisms where at least six index positions of a record column must be analyzed and the values associated with the respective index marks must be transformed one by one into respective movements of the printing element.

Compared with these known devices the present invention provides a novel principle the advantages of which will be particularly obvious in the translatorless analysis of hole combinations; however, if this should be considered advantageous in the one or the other instance, this principle could as well be applied to the so called single hole system. Though particularly suitable for the perforated record card system, it will become quite obvious from the specification that the idea according to the invention may also be applied to machines in which the index marks in the cards are provided in some way other than by holes.

It is therefore one of the main objects of the present invention to provide a machine of the indicated type which avoids the above mentioned drawbacks of the known machines operating with translators as well as those of the so called translatorless machines. An important object of the invention by which the results aimed at are obtained is the provision of driving means for the registering means performing a single driving movement upon the analysis of each index position, in combination with means for automatically varying the extent of the driving movement in accordance with the values associated with the index positions and with clutching means common to all index positions of a record column for clutching said driving means to said registering means upon the analysis of an index mark.

A further object of the invention by which the results aimed at are obtained is the provision of reciprocating driving means for the registering means performing a single driving stroke upon the analysis of each index position, in combination with means for automatically varying the extent of the driving stroke in accordance with the values associated with the index positions.

Another object of the invention is to provide in a machine of the before mentioned type common driving stroke varying means for a plurality of registering elements.

Still another object of the invention is to make provisions for coupling of the driving means to said registering means and for uncoupling therefrom while the drive is at rest, thus enabling a safe and quiet operation. This is obtained due to the provision of dead centres in the driving operation.

A further object of the invention is the provision of coupling means in a machine of the indicated type, said coupling means being common to all index positions of a record column and being rendered effective under the control of an index mark.

A further important object of the invention consists therein that said driving means perform upon the analysis of each index position a single driving stroke from the same home position and that the coupling means are provided in the home position of said driving means.

A further object of the invention consists in the inclusion of a rockable lever in said driving means, said lever performing a single driving stroke upon the analysis of each index position.

Still another object of the invention consists in the provision of a pivotally mounted rockable double arm lever being driven at its one end and driving by its other end the registering means, in combination with means for automatically varying the pivot of said lever in order to obtain a variation of the driving stroke upon the subsequent atnalysis of the index positions.

A further object of the invention consists in the provision of a crank drive for the registering means, said crank drive performing a single driving stroke upon the analysis of each index position.

A further object of the invention is to provide a tabulating machine having an accumulating and a printing mechanism into which the partial values associated with the index positions are entered upon the analysis of the index marks and wherein the mechanism for automatically varying the driving stroke is used for both the accumulators and the printing mechanism.

Still another object of the invention is to provide in the tabulator of the above mentioned type means for controlling upon total taking the printing mechanism by said accumulator mechanism in partial values by means of said reciprocating driving means.

Further preferred features of an embodiment of the invention will be seen from the following specification and the drawings. This embodiment illustrates a tabulating machine controlled by double deck perforated cards which is equipped for item and total printing. The translatorless machine according to the invention permits such a compact construction that the machine is particularly suitable as small type machine which, however—also due to the construction according to the invention—possesses a remarkable efficiency.

The machine is illustrated in the accompanying drawings. Details are specially represented.

Figs. 1a and 1b are perspective illustrations of the machine as viewed obliquely from the front at the right and left hand side respectively.

Figs. 2 and 3 show the perforation code according to which the cards are punched and of which Fig. 3 illustrates separately the perforation code for the numerals. In the column P the position number is indicated in Roman numerals, while the column E indicates the values associated with the individual positions. These values are different in Figs. 2 and 3 since the printing device is adjusted according to the values in Fig. 2 and the accumulator according to the values in Fig. 3. In the upper row of numerals in Fig. 2 there is indicated by a number the position which the character assumes on the circumference of the type wheel while in the lower row the characters proper are indicated. In Fig. 3 only the numerical characters in the lower row are indicated corresponding to the associated hole combination.

Fig. 4 shows a perforated record card as used in the present machine.

Fig. 10 shows the crank drive in its actual embodiment as viewed from the underside of the machine if the bottom plate is removed.

Fig. 11 shows a section according to line A—B through the crank drive of Fig. 10.

Fig. 12 shows a part of the crank drive from the rear.

Fig. 13 shows the right hand side view of the machine with the cover removed.

Fig. 14 shows a section through the machine.

Fig. 15 shows a partial view of a type wheel.

Fig. 16 shows the clutch magnet for type wheel and accumulator wheel in section.

Fig. 21 shows in front view the arrangement of the type wheels of the printing mechanism, the types being, however, omitted.

Fig. 22 shows the divisional arrangement of the clutch levers.

Fig. 23 shows the divisional arrangement of the clutches.

Fig. 24 shows a section through the accumulator.

Fig. 25 shows a view of an accumulator place longitudinal to the axis.

Figs. 26 to 29 show the various cams for the analysis of the accumulator setting.

Fig. 30 shows a circuit diagram for the suppression of zero-printing before the highest decimal place of a number.

Fig. 31 shows a section through the analyzing device for the cards.

Fig. 32 shows a device for lifting the brushes upon the passage of the space between the cards.

Fig. 33 shows the rear view of the machine with the accumulators removed.

Figs. 34 to 36 show details of the advance mechanism for the card feed.

Fig. 39 shows a part of the plug board in section.

Fig. 40 shows the various layers of the plug board in top view.

Fig. 41 shows a part of the plug board with a plug for the accumulators.

Fig. 42 shows a part of the plug board with the plug for the group control.

Fig. 43 shows the circuit diagram of the machine.

Fig. 44 shows the relay and cam diagram of the machine.

Figs. 45 to 47 show the various cam controlled contacts.

*Principle of the operation*

Figure 1A:
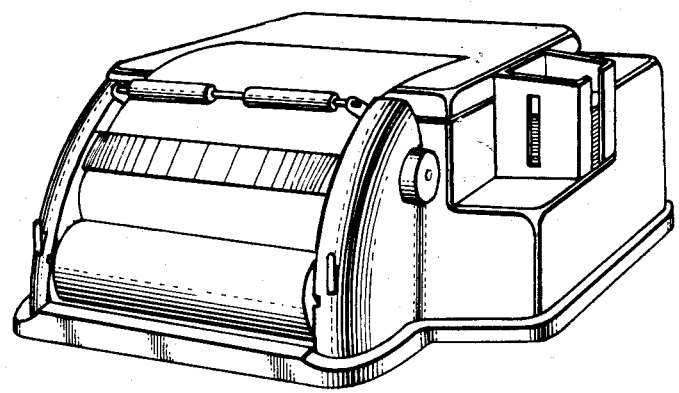

The mechanism of the tabulating machine is so constructed that it operates according to the code shown in Fig. 2. The code is so arranged that the interpretation of a character is given by a value resulting from the addition of the partial values associated with the various hole positions. The valuations for the various rows are selected in a way which allows a certain value to be indicated only by a single hole combination. In determining the code it has further been assumed that for numerals, alphabet and other characters there are about 45 hole combinations necessary. In order to obtain a certain margin the code was chosen with 47 characters plus a vacant field thus permitting in Fig. 2 the insertion of two further characters, if desired.

With the exception of the numerical characters, the characters can be associated arbitrarily with the various hole combinations, but the position of a character within the row of characters is determined by the numerical interpretation of the hole combination. Acocrdingly, in arranging the type on a type wheel the latter must be divided into 48 equal sections. A particular character is associated with each section.

The printing device consists of a row of adjacent type wheels. There is a common drive provided for all type wheels to which the type wheels may be clutched. Clutching takes place as soon as a hole has been detected in the analyzed position. Unclutching is effected automatically as soon as the type wheel has been adjusted to the corresponding value and the card is moved to the next hole position. Printing will only take place if all six positions of a column have been analyzed. Accordingly, clutching can be effected for each position and unclutching will automatically take place past each position wherever clutching has been effected. In this way it is possible that the type wheel may be adjusted several times before printing takes place.

The drive is provided in such manner that the extent of the driving stroke is varied from position to position except between the two lowermost positions. If several holes are provided in a column the amounts of the displacements of the driven wheels will be added one by one. If it is assumed for instance that the third and fifth positions of a column are punched the type wheel will be moved upon the analysis of the position II through 4 units and upon analysis of the position V through 16 units. Upon analysis of the positions I, II, IV, VI no movement takes place since there was no hole provided in the same and consequently a clutching operation has not occurred. Accordingly, the type wheel had been moved for 20 units which according to the code corresponds to the character E.

The values in column E in Fig. 2 apply to the printing device only. For the accumulator mechanism a different value distribution, which however is similar to that of the printing device, has been adopted as is shown in Fig. 3 in column E. In both figures the same hole combination represents of course the same numerical interpretation. Owing to the different values of the positions, however, zero is transferred into the printing mechanism as a unit but not into the accumulator mechanism. Moreover, the code for the accumulator mechanism will provide the proper numerical value upon addition of the partial values of the single hole positions while the numerical types of the printing device are placed in positions other than those corresponding to their numerical interpretation. Thus for instance the numeral "3" in the accumulator mechanism is composed of the partial values 1 and 2 while in the printing mechanism it is composed of the partial values 2+4=6. This means that the numeral 3 is provided on the sixth position of the type wheel circumference.

The adjustment of the printing and accumulating mechanism according to the values is effected from a common drive with the only difference that a different ratio is provided for the accumulating or the printing device respectively. Moreover, by means of cams the current through the clutch magnets of the counters is controlled in such manner that no current can flow to the counters upon analysis of the positions I and VI.

The perforated record card (Fig. 4) is formed as double deck card. Each deck has 30 columns with 6 hole positions in each column. The perforation columns of both decks are analyzed simultaneously one by one, position by position, and the result of the analysis is transferred to the printing and accumulating mechanism.

The machine is provided with 80 printing positions which by means of the plug board may be connected to each of the brushes or columns respectively. The circuit diagram will be described more in detail later on. The drive for the printing and accumulating mechanism is effected by a crank drive. The crank drive was chosen because it permits a quiet and safe clutching and unclutching at its dead centre positions. Further the return movement which necessarily occurs in a crank drive can be used for unclutching. The positions of the crank drive which occur during the analysis of one deck are illustrated in the operating diagrams according to the Figures 5–9.

The crank 11 is continuously driven with constant speed in counterclockwise direction. During each turn of the crank the card is advanced for one position. Upon each full revolution of the crank 11 the crank 12 is displaced one step in counter-clockwise direction. This displacement will be described in more detail later on. A rod 14 is pivoted to the crank 11, said rod being provided for reciprocating movement in the guide 15. (This guide is only symbolically indicated in Figs. 5 and 9 while actually it is constructed differently therefrom.) The right hand end of rod 14 describes an ellipse-like curve. If the guide 15 is moved the curve will change. At the right hand end of the rod 14 there is a rocker 13 connected thereto by the link 16 which latter rocks in accordance with the curve. The angle through which the rocker 13 swings is dependent upon the shape of the curve. The guide 15 is now moved in such a way as to cause the various angles of swing of the rocker 13 to be proportioned to each other in the same manner as the values according to Fig. 2. In all five positions (the sixth position is identical with the fifth position) a constant angle must be subtracted in which the rocker runs idle on account of the play between the gears, and other parts. This play is also necessary for another reason and as will be shown later, it is intentionally increased so that the drive can remain stationary at the moment of clutching. If the play were not provided there would always still be a movement of the drive at the dead centre. The moment at which movement ceases would then be decreased to an indefinitely small value.

The position and dimensions of the crank drive have been chosen in such a manner that at the one dead centre of the rocker 13 the guide 15 as well as the auxiliary crank drive cooperating therewith (described later) may be adjusted without changing the position of the rocker 13. This is necessary since the clutch for the clutching of the registering places to their drive must be always in the same position independently of the position in which the guide 15 happens to be. It is only necessary to take care that the guide 15 has already reached the positions (indicated in Figs. 5 and 9 by Roman numerals in accordance with the hole position designation) associated with the analyzing positions of the hole positions at the second dead centre of the rocker 13 (indicated in dash lines in Figs. 5 and 9), since the position of this point determines the amount by which the type wheel will be advanced.

The adjustment of the guide 15 is effected by the crank 12. The latter makes one revolution for each card run. Dimensions and positions have been chosen here in such manner that the unequal distances between consecutive positions of the guide 15 on the rod 14 are transformed into equal movements of the crank 12. This is an advantage in so far as in addition to the step by step shifting also a continuous drive of the crank 12 can be derived from crank 11, if desired.

Figure 9:
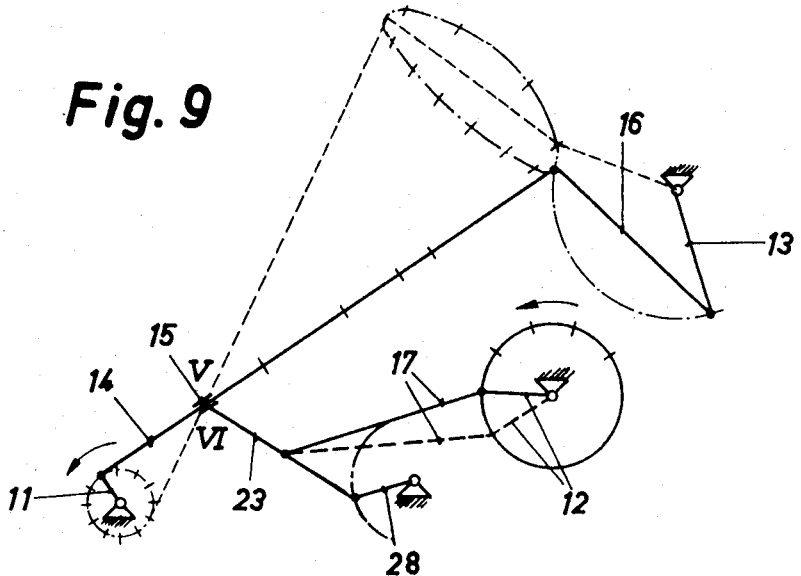

As may be seen from Fig. 2 the same value 16 has been provided for the positions V and VI. The position of the crank drive for these two positions is shown in Fig. 9 and must result, as has been indicated above, in twice the same displacement though the crank 12 is turned for one step. This is obtained by reason of the fact that disposal of link 17 in the V-position shown in full lines in Fig. 9 and also disposal of said link 17 in the VI-position shown in dashlines gives the same position for the guide 15.

Construction of the crank drive

The actual construction of the crank drive is shown in Figs. 10, 11 and 12. The rod 14 consisting of two adjacent metal sheets is linked to the crank 11. It has a rectangular cut out portion 14a in which can slide a guide piece 20 (Fig. 11). The guide piece 20 is loosely seated and rotatable upon the pivot pin 18. On the pin 18 there are further mounted the two loose guide pieces 19 adapted to slide in the guide bars 21 which are provided on both sides of rod 14 and are fast to the base plate. As a protection against mutual interference of rod 14 and the guide bars 21 and in order to prevent the guide pieces from sliding off the disks 22 are provided between the guide pieces 20 and 19. The arrangement of the guide pieces permits sliding of the pin 18 in the guide bars 21, sliding of the rod 14 on the pin 18 and rocking of the rod 14 relative to the fixed guide bars 21 about the axis 18. The displacement of the guide pieces is effected by the two links 23 which are screwed fast to the pin 18. At the left hand end of the rod 14 the rocker 13 is connected by the link 16. The rocker 13 is rotatably mounted on the stud 24 which is fast to the base plate and upon which also the toothed segment 25 can turn loosely. The rocker can take the toothed segment 25 with it by engaging the two stops 26. The position of the stops has been chosen in such manner that upon the change of direction the rocker 23 moves idly through a certain angle with respect to segment 25. This idle movement is necessary in order that when clutching of the registering mechanism takes place (as before mentioned) at the one dead centre, the drive is stationary. The toothed segment 25 meshes with the pinion 27 from which the drive for the printing mechanism and counter is derived.

The positioning of links 23 and therewith of guide 15 is effected by crank 12 which in practice takes the form of a ratchet wheel. The rocker 28 connected to the links 23 is rotatably mounted at its right hand end on the stud 30 which is fast in the casing. The rocker 28 is necessary in order to safeguard the proper positioning of the link 23 and thereby also of the guide.

Movement of the ratchet wheel 12 is effected by pawl 29. The pawl 29 is rotatably mounted on the rocker 31 (Figs. 10 and 12) and is resiliently held against the ratchet wheel 12. The rocker 31 is driven by an eccentric 33 and the eccentric rod 34. The eccentric 33 is mounted upon the same shaft as the crank 11 so that the rocker 31 will rock back and forth once at each revolution of the crank 11. By this means the ratchet wheel 12 will be moved one step by means of pawl 29. By this movement the movement of the guide 15 is effected through links 17 and 23, the link 17 being pivotally mounted on the ratchet wheel 12.

The position of the guiding pieces in the guide bars 21 must be exactly defined after the rocker 23 has reached the outer dead centre. This is necessary since in this moment declutching of the type wheel takes place. As indicated above, this dead centre position also indicates the value for the associated position. During the remaining time the guide may be moved, this movement having however no influence upon the adjustment. The position of the guide has no influence upon clutching since the crank drive and the position of the guide bars 21 have been chosen in such manner that the position of the one dead centre is independent of the positioning of the guide. Provision must be made that forces occurring and tending to move the guide from the predetermined position which must in no event occur at the outer dead centre, cannot have any influence. Therefore the ratchet wheel 12 is arrested at this moment and is blocked in both directions of rotation so that no unforeseen movements can arise. Blocking is effected by the lever 35 with its semicircular cut out portion 35a. The cut out portion 35a of lever 35 can engage over the screw heads 36 thus blocking the rotation of the crank disk 12 in both directions. This blocking must be maintained for some time. Moreover, a quick engagement is desired which is obtained by a snap-action mechanism. The arm 37 (Fig. 12) is rotatably mounted upon the stud 38 fast to the casing and is connected through link 39 to the rocker arm 31. Therefore the arm 37 will rock synchronously with the rocker arm 31. Upon the stud 38 there is also rotatably mounted the lever 35 which is connected by spring 41 to the arm 37. Under the influence of the rocking movement of arm 37 the lever 35 will now continuously snap back and forth between the stop 42 and the screws 36. The dead centre has been positioned in such manner that the lever 35 engages the screw 36 when the guide or the screws 36 respectively have reached the proper position.

In order to compensate for tolerances and play and to permit an exact adjustment of the strokes the various screws 36 or the teeth 43 of the ratchet wheel are individually adjustable. The ratchet wheel 12 is constructed as a simple disk to which each of the teeth 43 is fastened by means of a screw 36. The screw holes in the disk are somewhat larger thereby providing a limited adjustability. In order to prevent rotation of the teeth 43 the latter engage inside with a disk 44. In order to compensate for differences in the division which possibly might occur by the assembling, a larger stroke has been provided for the pawl 29 than for the normal division.

The six screws 36 and teeth 43 that are necessary for the various positions of the guide 15 are spaced a smaller distance from each other than the remaining three.

These three screws are required in order to restore the crank drive, for positioning the guide, to its home position again. During this time also printing and card change will take place. The distance between these three screws has been somewhat increased in order that in the interval between two cards which corresponds to four normal shifting steps, only three steps may occur.

Clutch system for type wheels and accumulator

The back and forth movement of the pinion 27 (Fig. 10) is transferred through a gear mechanism, which will be referred to later, to the shaft 78 having the gears 45 (Figs. 17 and 18) fast thereon. The arrangement of the wheels in Figs. 17 and 18 does not exactly correspond to the position in the machine. This arrangement has been chosen in order to permit a clearer view of the section in Fig. 18. For each type wheel a pinion 45 is provided. The latter meshes with the pinion 46 which is firmly pressed upon the ring 47. In the ring 47 there is provided a slot 47a accommodating the pawl 48 and the spring 49. By spring 49 the pawl 48 may always be held in one of two rest positions. The ring 47 only rotates upon the teeth of actuating wheel 51. To the actuating wheel 51 the pinion 52 is rigidly fixed the latter engaging the pinion 53. The actuating wheel 51 is rotatably mounted upon the shaft 50 and the gear 53 is rigidly connected to the type wheel 54.

According to the value of the effective hole position each ring 47, driven by its pinion 45 will be rotated. If the clutch magnet has been energized slightly earlier by a hole in the card, the lever 81 will encounter the pawl 48, which will be pressed into a gap between the teeth of the actuating wheel 51, said pawl taking the wheel 51 with it in clockwise direction. Through pinions 52 and 53 the type wheel is thereby moved accordingly. Engagement of the pawl can only occur in a predetermined position which is referred to later on in the circuit diagram. The position of the pawl is determined by the crank drive as has already been mentioned. The movement of the actuating wheel 51 always takes place for a multiple of the pitch so that the teeth will always be again in the proper position for engagement.

Figure 17:
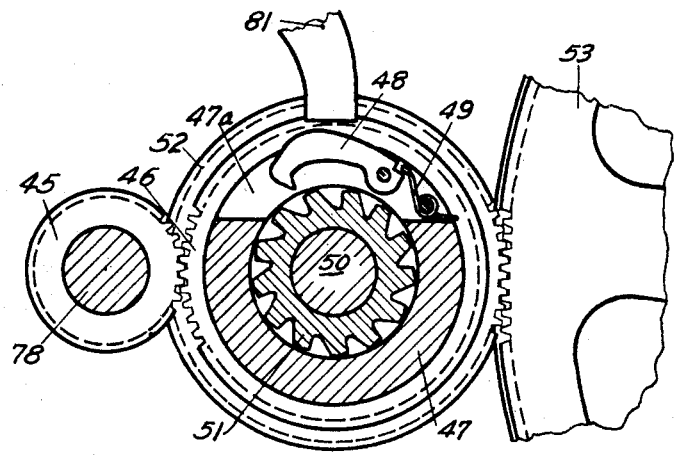
Fig. 17 shows the clutch mechanism for the type wheel in a section vertical to the axis.
Figure 18:
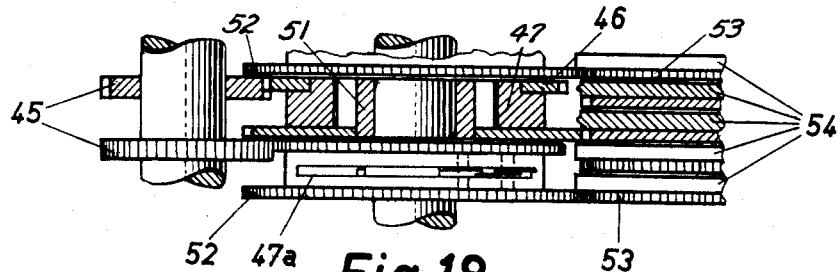
Fig. 18 shows the clutch mechanism for the type wheel partly in section and in top view.

Upon backward movement of ring 47 the type wheel 54 and therewith gear 53 are locked against backward movement by spring 56 (Fig. 14). The spring 56 engages with a locking wheel 57 which is fast to the gear 58, the latter meshing again with gear 53. Accordingly, also gear 51 is blocked against rotation in clockwise direction (Fig. 17). The pawl 48 is forced outward by the inclined back face of the tooth until it reaches its outer position in which it will then be held by the spring 49. Accordingly, declutching will automatically take place right at the beginning of the backward movement. The ring 47 will now run back until the dead point for the next clutching operation is reached.

Figures 19, 20:
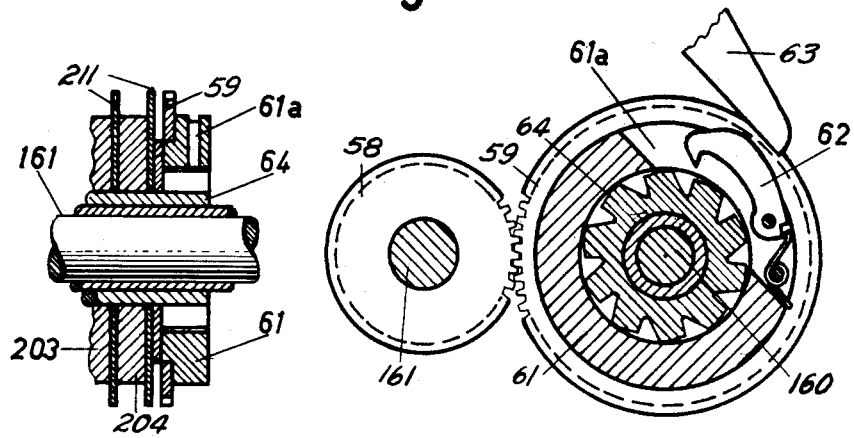
Figs. 19 and 20 show the clutch mechanism of an accumulator place in a section longitudinally of and vertical to the axis.

In the counter (Figs. 19 and 20) setting is effected in a similar manner as with the type wheel. In this case the drive is from gear 58 meshing with gear 59. Gear 59 is fast with the ring 61 in which slot 61a with the pawl 62 are provided. (Drawn in clutched position.) Engagement is effected by means of lever 63. The ring 61 rotates upon the actuating wheel 64 which differs from the actuating wheel 51 of the printing mechanism by having only 10 instead of 13 teeth. The actuation through ring 61 from the drive 58 takes place in such a manner that the position of the gear 64 indicates the accumulator setting and that accordingly the gear 64 represents at the same time the accumulator wheel.

*Printing device and its drive*

The crank drive is arranged at the bottom of the machine in such manner that it is easily accessible from below (Fig. 14). The drive for the crank drive is effected by motor 65 (Fig. 33) over the reduction gear 66, the gear 67 (Fig. 14) and the bevel gears 68 and 69 (Fig. 14). On the worm shaft 112 on which the bevel gear 69 is mounted, the crank 11 is also mounted. Accordingly the crank drive is continuously running as long as the machine is in operation. The drive is effected through the described crank drive from pinion 27 through shaft 71 (Figs. 10 and 13) to the bevel gears 72, 73 and 74. The bevel gear 73 (Fig. 23) is fast together with the pinion 75 upon the shaft 76. Pinion 75 is in engagement with the two toothed wheels 77a, 77b, each driving a shaft 78 upon which are mounted the driving wheels for the clutches to the type wheels said driving wheels being generally indicated at 45 in all printing places.

Staggering of the clutches in two groups has been chosen in order to obtain a small type pitch. In this way a printing column pitch of 3 mm. will suffice.

The arrangement of the clutch magnets requires a further staggering in six groups. The magnets are so arranged that always three groups of magnets operate upon one group of the two groups of clutches. From Fig. 17 it may be seen that the position of pawl 48 or of ring 47 is of no importance for the position of clutch engagement. It is only imperative that engagement of the point of the pawl is always over any one of the tooth gaps of the actuating wheel 51. Accordingly, the position of the pawl is only a question of assembling and of the arrangement of the clutch levers. The position and form of the clutch lever (Figs. 14 and 22) has been chosen in this instance in such manner that as far as possible the same parts may be used and only few mounting points are necessary. The clutch levers are rotatably mounted upon the three spindles 79 and provision is made that they are alternately directed upward and downward on each spindle. Each of the levers 81 of both outer spindles 79 acts upon the same group of clutches while the levers 82 of the middle spindle 79 acts alternately upon one of both groups of clutches. The clutch levers are held in their home position by springs 83. A clutch magnet D may act upon each clutch lever.

For reasons of space the magnets D have been constructed differently from the usual type. This construction is shown in Fig. 16. This construction affords the further advantage that these magnets can be easily concentrated into a constructional unit on a wall.

The magnets are here fastened to the intermediate wall 85. More in detail the magnet consists of a core 86 slidable in the sleeve 87. Its movement is limited by the nut 88 and the disk 89. The latter is riveted to the core 86. During assembly the sleeve 87 is drawn by the nut 91 against the wall 85. The cover 92 is then held between wall 85 and sleeve 87 by nut 91. The cover 92 is necessary in order to establish the magnetic circuit. Within the cover 92 there is provided the winding 93 upon the spool 94. In the cover 92 there are provided two slots permitting the soldering terminals 95 to pass through. The nut 88 presses upon the lever 81 or 82 respectively (Fig. 14), and in its rest position is pressed by spring 83 through lever 81 against the sleeve 87. If the magnet is energized (position shown in Fig. 16), the plate 89 is drawn towards the cover 92. The nut 88 presses upon the clutch lever which in turn presses the pawl 48 into the tooth gap of the actuating wheel 51. Through the magnet D there will be only a brief current impulse since for clutching only a brief attraction is necessary. This permits comparatively high currents to flow through the winding without destroying the same by overheating. Corresponding to the higher currents therefore, also greater magnetic forces may be exerted than would be possible with normal magnets of the same size.

The type wheels 54 (Figs. 14, 21) are rotatably mounted upon the shaft 98. In each type wheel there is provided a recess 54a in which engages the pawl 99. The pawl 99 is rotatably mounted upon the stud 101 which is fast on gear 53. The toothed wheel 53 and type wheel 54 are fastened to each other as has already been mentioned. The pawl 99 is pressed by spring 102 against the shaft 98. The shaft 98 is provided with a nut 98a. Upon actuation of the type wheel the latter will rotate in clockwise direcion whereupon the pawl 99 slides over shaft 98. Since the shaft 98 is driven by a crank drive it reciprocates forward and backward. The rhythm of the reciprocation has then been so chosen that it corresponds to the analysis of the card. While the type wheels are being set the shaft 98 rotates in counterclockwise direction. During this movement the pawl 99 can jump over the groove 98a. After printing the shaft 98 will rotate in clockwise direction. Depending on the position of the type wheel the pawls 99 are engaged by the groove 98a and will be moved by the latter whereby the type wheels are restored to their home position. Reciprocation of the shaft 98 has further been chosen in such manner that the latter will move a little more than 47/48 of a whole rotation. In this way when zeroizing occurs all type wheels which have been set will be moved while zeroizing has no influence upon the wheels which have not been set. The drive for the shaft 98 will be referred to later on.

During printing the types must be exactly aligned. This is achieved in that, shortly before printing, the yoke 103 (Figs. 14, 15) is pressed against the type wheels. In the type wheels grooves 54b are provided in which the point 103a of the yoke 103 will engage and will adjust the type wheels. The types 104 are pressed into dovetail-like grooves.

Figure 1B:
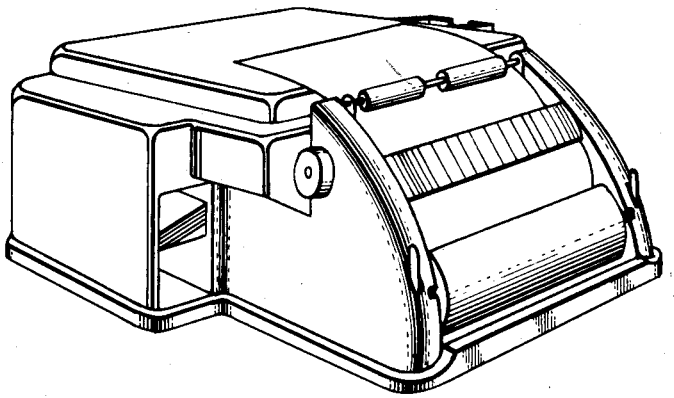
Figure 5:
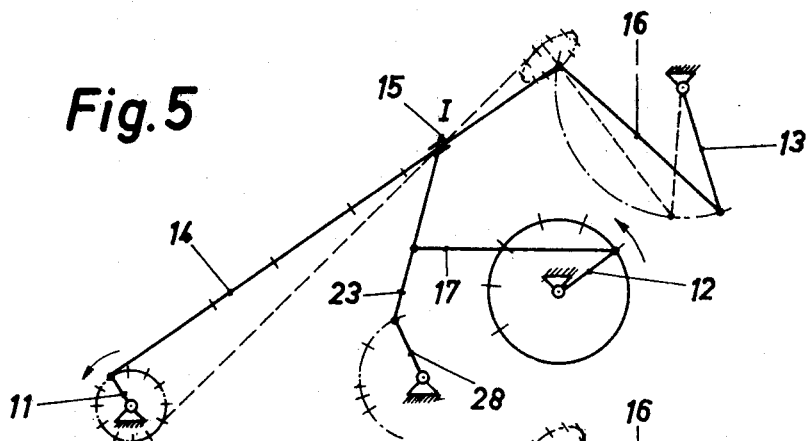
Figs. 5 to 9 show diagrammatically the crank drive in its various positions.
Figure 6:
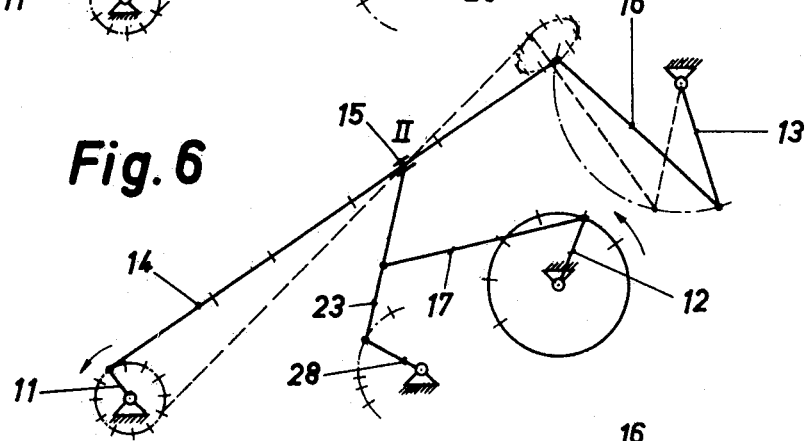
Figure 7:
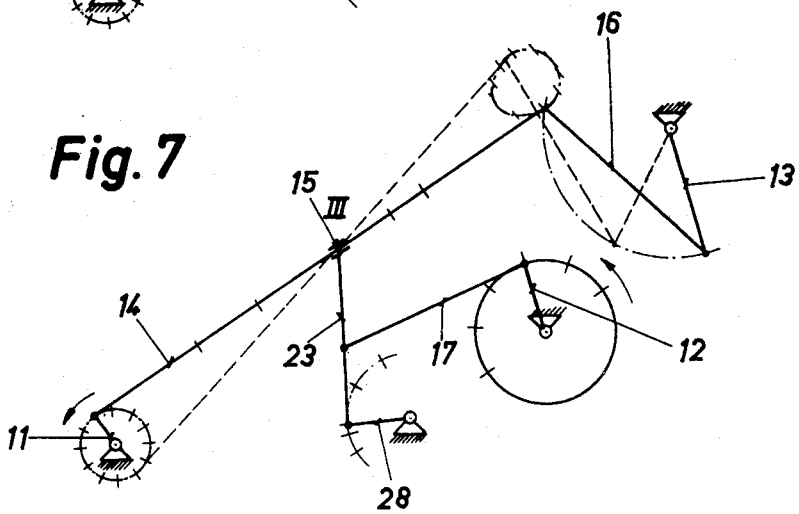
Figure 8:
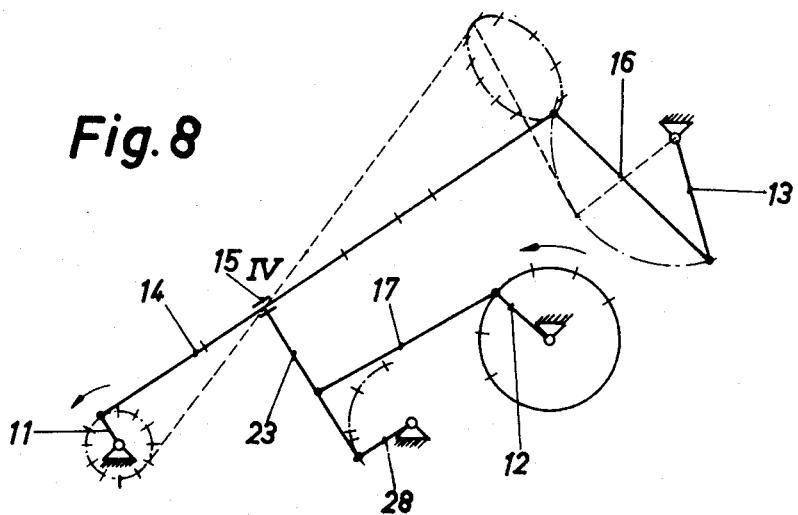

The paper roll 105 is provided on the front side of the machine (Figs. 1 and 14) and is easily interchangeable. The paper is fed over the roller 106 between the type wheel and the ribbon 107 as well as between the rollers 108 and 109. The roller 108 takes care of the feed of the paper. Above the ribbon 107 there is provided the printing hammer 111. The types proper will not be in contact with the printing ink in any way. This affords the advantage that the types cannot be smeared over. A particular advantage of this arrangement consists in that the printed characters are visible immediately after printing.

The cycles: adjustment of the type wheels, printing and zeroizing take place in the same operation so that their movements may be derived from the same drive. The drive for the same is effected from worm 112 and the worm wheel 114 (Fig. 14). The worm 112 is mounted on the same shaft as the crank 11 of the crank drive and the bevel gear 69. A ratio of 1:9 has been chosen between worm and worm wheel. This is required by the fact that after 9 revolutions of the crank 11 the crank drive has again reached its home position. The worm wheel 114 is fast upon the shaft 113 which latter extends to the left (Fig. 33) through the side wall 115.

On the left hand end of shaft 113 there is provided the crank 116 (Figs. 33 and 13). The rocket 118 is connected to the crank 116 through link 117. The rocker 118 is rotatably mounted upon the bolt 119. To the lower point of the rocker 118 there is also connected the rocker 122 through link 121. The rocker 122 is pivotally mounted upon the bolt 123. Further the rocker 118 is pivoted to the rack 124. The rack is in engagement with the pinion 125. The pinion 125 is fast upon the shaft 98 which effects zeroizing as has already been described. The rack 124 is secured against dropping by the roller 127. The rocker 122 reciprocates in the synchronism with the rocker 118. On the upper pivot of the rocker 122 the lever 128 is rotatably mounted said lever having a lug 128a urged by a spring 129 against the rocker 122. If the rocker 122 moves to the left the lever 128 will encounter the lever 131 whereby the former will jump to the right and will engage on the left of lever 131 behind the same. If now the rocker 122 moves to the right again the lever 128 is prevented by lug 128a from rocking relatively to rocker 122 so that lever 128 engages lever 131 until the latter slides over lever 128 and then jumps back to its home position due to the spring 132. The home position is determined by the rubber buffer 133. The rubber buffer 133 is adjustable by means of the angle 130. The lever 131 fast upon the shaft 134 upon which the printing hammer 111 (Fig. 14) is also fast. The rest position of the printing hammer is indicated in Fig. 14. Its position is so adjusted by means of the rubber buffer 133 that the paper may be easily pulled through. As has been just described the hammer is retracted by lever 131. Upon release the rubber will yield somewhat due to the momentum so that the hammer will press ribbon and paper against the types.

If the rocker 122 moves to the right (Fig. 13) it will encounter the roller 135 which is provided upon the lever 136. The lever 136 is fast upon the shaft 137 and is pressed by spring 138 against the stop 139. Attached to the shaft 137 in such a manner as to be capable of yielding resiliently in the direction of rotation is the yoke 103 (Fig. 14) for the alignment of the types. Upon this movement the rocker 122 will move along the lever 136 to the right whereby (as already described) the yoke will be pressed against the type wheels and will align the types. Furthermore the locking wheels 57 for the type wheels are loosely rotatable on the shaft 137.

The paper feed is effected by roller 108 (Fig. 14) which is fast on the shaft 141. Also fast on the shaft 141 is the ratchet wheel 142 (Fig. 13). The ratchet wheel is shifted by pawl 143 rotatably mounted upon the rocker 118 said pawl being urged towards the ratchet wheel by spring 144. Locking of the ratchet wheel is effected by spring 145 which is fastened to the angle 146 and which can be adjusted to the proper position. Upon movement of the rocker 118 to the left the pawl 143 will shift the ratchet wheel 142 for one step. The extent of the step corresponds to the spacing of the lines on the paper web.

The position of the crank 116 has been chosen in such manner that the rocker 118 reaches the right hand end of its movement after the adjustment of the type wheel has been completed slightly earlier. Upon the movement of the rocker to the right, retraction of the printing hammer, alignment of the type wheels and printing are effected. When the rocker 118 moves to the left zeroizing and paper feeding take place. Independently thereof the return movement of the crank drive and the card change take place.

The pressure rollers 109 pressing the paper towards the feed rollers 108 are rotatably mounted upon the shaft 147. The shaft 147 is fixed in the two levers 148. Each lever 148 is rotatably mounted on a stud 149. The roller 109 is pressed towards roller 108 through lever 148 by spring 151. The spring is arranged in such a manner that upon manual raising of the lever 148 the latter can snap rearwardly. This permits an easy insertion of the paper. Further in Fig. 13 a device is shown which permits an easier insertion and removal of the paper roll. The paper roll 105 is moved with its studs into the recess 152 towards the spring 153 until the stud rests behind the lever 154, and is held by the latter in this position. The lever 154 is pressed by spring 155 towards the stop 156. If the paper roll is to be removed the lever 154 is manually pressed to the right (Fig. 13) whereby the studs of the paper roll will be released and the spring 153 will press the studs and the roll outwardly.

*Accumulator mechanism and its drive*

The accumulators add the partial values entered into them and communicate the result again in partial values to the printing mechanism. This latter procedure is necessary since the printing mechanism can only be set according to partial values.

The setting of the accumulators is effected by a clutch similar to that of the printing mechanism which has already been described. The accumulators are located at the rear of the machine (Fig. 14 and 24) in two rows, each row comprising 25 accumulator places. Accordingly the machine can operate altogether with 50 accumulator places. There are 25 accumulator wheels freely rotatable on each of the two shafts 160a, 160b respectively. The allocation of the accumulator places to different accumulators can easily be catered for during assembly. In the present instance this is effected by splitting the various accumulators by interrupting the tens transfer at the point of split and by substituting therefor a zeroizing clutch which will be referred to later.

The drive for the two rows of accumulators is effected by the shaft 161 upon which the gears 58 are fast. The gears 58 operate directly on the upper accumulator places through the idle gear 162 on the lower accumulator places. The idle gear 162 is freely rotatable on the shaft 163. Clutching is effected by levers 63a and 63b respectively by means of the magnets Z as has already been described. Declutching is also effected in a known manned by backward movement of the drive. Locking of the accumulator against backward movement is effected by ratchet wheel 157 and spring 170 (Fig. 24). The ratchet wheel 157 is used at the same time for the tens transfer.

The tens transfer mechanism is of a known construction similar to that of the Hollerith machines. The pawl 164 is rotatably mounted on the lever 164 and is pressed by spring 166 against the ratchet wheel 157. The lever 165 is rotatably mounted on the axis 160 and is drawn by spring 167 in the counterclockwise direction. The lever 165 is however prevented from displacement by the nose 168a of lever 168. The lever 168 is pressed by spring 169 against the lug 165a (Fig. 25) of lever 165. When the accumulator wheel rotates, the pawl 164 will slide over the teeth of the ratchet wheel 157. To the pawl 164 a stud 171 is fastened which passes below the lever 168 of the next lower denominational accumulator place. The teeth as well as the stud 171 are formed in such a manner that the normal teeth will raise the stud 171 only so far that the latter cannot reach the lever 168. On the ratchet wheel there is provided adjacent to the normal teeth a larger tooth 157a. Its position corresponds to the 9-position of the accumulator wheel. If the tooth 157a passes the pawl 164 which means that the accumulator wheel has been moved from 9 to 0 the pawl 164 will be raised so far that the stud 171 engages the lever 168 of the next higher denominational accumulator place. The lever will release the lever 165 of its associated denominational place which latter lever will jerk under the tension of spring 167 to the left until the lever engages the yoke 172. If at this time the pawl 164 engages the larger tooth 157a it will release, in the manner just described, the lever 165 for the next higher denominational place. After the adjustment has been completed the yoke 172 will be rocked in clockwise direction and will restore to their home position the levers 165 which have been released. Hence the pawl 164 will move the ratchet wheel 157 for one unit thus completing the tens transfer.

It is not necessary that zeroizing of all the accumulators must take place simultaneously. If desired zeroizing can be effected individually for each accumulator. This may become necessary if the machine is equipped in a known manner with two group controls (main and sub group). In order to allow for this possibility, tubes 173 are mounted on the shaft 160 the length of each tube corresponds to the span of an associated accumulator or to the number of denominational places of said accumulator. In the ratchet wheel 157 there is provided a recess 157b in which the spring 174 engages. During setting of the accumulators this spring will slide over slots provided in the sleeve 173, while the sleeve 173 remains stationary. When the accumulator is zeroized the tube is rotated once in the clockwise direction. Depending upon the settings of the accumulator places the spring 174 will engage in the slots at different times so that the accumulator wheels will be moved by the sleeve and will be zeroized. Rotation of the sleeve 173 is effected by a gear (not shown) which is fast on said sleeve. This gear is provided only once for each accumulator at the end thereof. The gear is in engagement with the gear 175 (Fig. 24) freely mounted on the shaft 176. The shaft 176 makes one revolution after each setting operation. In the shaft 176 there is provided a groove by means of which the gear 175 may be connected to the shaft by means of a one revolution clutch. After the total has been read off the zeroizing magnet N (only indicated in Fig. 43) is energized. The zeroizing magnet is in the same row of magnets as the clutch magnet Z and resembles the same in its construction. The zeroizing magnet presses upon the lever 177 (Fig. 24) which releases the pawl 178. The pawl 178 is rotatable on the gear 175 and is pressed by spring 179 towards the shaft 176. The pawl will engage in the groove of the shaft 176. After the total has been read off the shaft 176 begins to rotate. The sleeve 173 will then be moved by pawl 178 and gear 175 whereby zeroizing is effected. At the end of one revolution the pawl 178 will be drawn out of the groove by the lever 177 which in the meantime has been returned again to its home position due to the spring 181. At the same moment also the shaft 176 will be stopped. Zeroizing of all lower accumulator places is effected from the same shaft 176. The further transmission is effected by the idle gear 182 which is pivotally mounted upon the shaft 163.

The drives for zeroizing and for the tens transfer are derived from shaft 113 which makes one revolution per card passage. To the left hand end (Fig. 33) of the shaft 113 is fixed a chain wheel 182. The chain wheel 182 drives the chain wheel 184 through the chain 183 (Fig. 13). The chain wheel 184 is rotatably mounted upon the stud 185 and is rigidly connected to the toothed segment 186 and gear 187. The toothed segment 186 extends over one third of the circumference and will engage the gear 188. The ratio between the toothed segment 186 and the gear 188 is 1:3. By this means the gear 188 will rotate once if the segment makes one revolution. The revolution of gear 188 however takes place in one third of the time while it is in the rest position during the remaining two thirds. The gear 188 is fast upon the shaft 176 (Figs. 14, 24) from which zeroizing is derived as has already been described before. The position of the segment 186 has been chosen in such a manner that the same will engage the gear 188 when the setting of the accumulator or its analysis respectively has been completed.

The tens transfer may coincide with this operation since it can only be effected after the setting. Up to the time when the analysis is effected, which takes place only in the next operating cycle, the transfer is already completed. The drive for rocking the yokes 172 may therefore be derived from the gear 188. The crank 189 (Fig. 13) is fast to the gear 188. The rocker 192 is connected to the crank 189 by link 191. The rocker 192 is fast upon the shaft 160a, upon which the yoke 172 is also fast. The rocking motion must also be transmitted to the lower groups of accumulators. In this case it must be noted that rocking must take place in the opposite direction since the disposition of the lower group of accumulators is reversed relatively to that of the upper group of accumulators. This is effected by transmitting the rocking movement through link 193 to the rocker 194 which is fast on the shaft 160 associated with the lower group of accumulators. If the gear 188 and the crank 189 rotate once the two rockers 192 and 194 and the respective yokes 172 will rock and will restore the levers 165 to their home position again. The home position for the two rockers and the gear 188 must always be exactly determined. The gear 188 should not overrun when rotated rapidly. Furthermore it is required that the gear 188, as long as it is disengaged from the toothed segment 186, must not be free for rotation. This is effected by spring 195 urging the rocker 192 towards one end of its stroke whereby the position of the crank 189 and the gear 188 is determined. The drive for the adjustment of the accumulator place is effected from bevel gear 74 (Fig. 13) through shaft 196 and the bevel gears 197 and 198.

Analysis of the accumulator places must be effected in such manner that the result of each place can be composed of partial values. A further condition consists in that the places before the highest digit of a number shall not appear in printing as "0" and therefore shall not be transferred to the printing mechanism. These requirements are met by the device described below.

For reading off the result each accumulator place includes four cam disks 201, 202, 203, 204 (Fig. 25). The positions of the cams on each of the various cam disks have been chosen in such manner that the cams indicate the partial values of the accumulator setting. The cam disks are fast on the gear 64 (Fig. 20) which represents the accumulator setting as already described. Further, the ratchet wheel 157 (Fig. 24) for locking against backward movement and for ten transfer is fixed to the gear 64. The four cam disks are sufficient for the representation of the numerals since with exception of the zero-position the numerical code extends only over four hole-positions. The shapes and the relative positions of the cams with regard to each other are shown in Figs. 26–29. The cam disk 201 corresponds to the position II (Fig. 3) with partial value 1, the cam disk 202 to the position III with partial value 2, the cam disk 203 to the position IV with partial value 3 and the cam disk 204 to the position V with partial value 4. With each cam disk is associated a contact spring 205 which can be pressed by the cam upon the common conductor 206. Depending upon the setting of the accumulator the four springs are brought into contact with the common conductor according to the code (Fig. 3). All springs 205 are fastened on the stirrup 207 by means of plate 208. Two insulating plates 209a, 209b (Fig. 24) insulate the springs from each other and from earth. The cam disks are separated from each other by the disk 211. Analysis of the accumulator setting by springs 205 is effected by the cams 213. Analysis of the accumulator place is patterned after that of a card column. Hence on total taking the machine can continue to operate as before so that only the card feed must be interrupted.

Analysis takes place, as has already been described, in six cycles. Accordingly, also in total taking the analysis has been divided into six cycles. The analysis proper, however, extends only from the second to the fifth position (Fig. 3). The first position is only utilized for the zero and the sixth is omitted if numerals occur.

If the accumulator is to be analyzed the shaft 212 (Fig. 24) is shifted step by step. The extent of the steps has been so chosen that the shaft 212 reaches its home position again after six steps.

The shaft 212 on which the cam disks 213 are mounted is of hexagonal section. For each spring 205 there is provided a cam disk 213. The cams are offset relatively to each other by one sixth. The springs 205 are pressed by the cams one by one against the contact bar 214. A separate contact bar 214 is provided for each accumulator place, said bars fastened to the insulating bar 215. The contact bar 214 is connected through a lead, to the clutch magnet for the printing device on which the associated accumulator place is to act. The timing of the engagement of the springs with the contact bar corresponds to the analysis of the hole positions on the card. However, current can only flow through the springs if the same are pressed at the same time against the common conductor 206 by the accumulator cams 201–204. The position of the cams 213 has been chosen in such manner that of the six cycles of operation, or steps, the second to the fifth cycles relate to the cams. The first step is idle since in this position the "0" is transferred. This will be referred to later on. The sixth step remains also idle since it is not needed for the numerical code. In this analysis the sixth step signifies at the same time the rest position of the shaft 212.

The drive of the shaft 212 is effected step by step by means of the magnet 216 (Fig. 13). If the accumulator is to be analyzed the magnet 216 will receive current impulses. The sequence of the impulses corresponds to the rotation of the crank 11 of the crank drive. To the time sequence and limitation of the impulses reference will be made later in the description of the circuit diagram. At each impulse the magnet 216 will attract the armature 217. The armature 217 is brought again to its rest position by spring 218. The pawl 219 is pivotally mounted on the armature 217 and is pressed towards the ratchet wheel 222 by spring 221. Upon energization of the magnet 216 the ratchet wheel 222 is shifted each time by one step. The ratchet wheel 222 is rotatably mounted on the stud 223 and is rigidly connected to the gear 224. The gear 224 is in engagement with the gear 225 and through the idle gear 226 with the gear 227. The gear 227 is fast on the shaft 212a of the upper group of accumulators and the gear 225 is fast on the shaft 212b of the lower group of accumulators. The ratio between the gears is 1:1.

In the foregoing the requirement has been laid down that printing of the "0" before the highest digit of a number shall be suppressed. This is obtained by a particular wiring of contacts (Fig. 30). The wiring diagram in Fig. 30 shows only diagrammatically the wiring elements for the zero-suppression. Other wiring elements though included in this current circuit but serving other purposes have been omitted and will be described later on in connection with the wiring. Each accumulator place has a set of contacts associated therewith generally indicated at $b_{IV}$. These consist of four contact springs of which the two upper ones (Fig. 24) are closed when unstressed. In the 0-position of the accumulator wheel the longer contact spring is pressed downward whereby the three lower springs establish a conducting connection between themselves and whereby contact with the upper spring is interrupted (Fig. 27). The actuation of these contacts is effected by the cams 211a on the intermediate disk 211. The location of the cam has been chosen that way that the set of contacts $b_{IV}$ is actuated when the accumulator wheel is at zero. If the accumulator wheel is moved from the "0"-position the above mentioned shifting of the contacts will take place.

In Fig. 30 the Arabic index of the clutch magnet D and of the contacts $b_{IV}$ indicates with which accumulator place the same are associated. It has here been assumed that the units place is indicated by the Arabic index 1 and the higher denominational places by the indices 2, 3, 4, 5. If it is for instance assumed that the number 3050 is to be read out of the accumulator, contact $b_{IV}^2$ and $b_{IV}^4$ will have been moved to the position shown in Fig. 30 since in the tens place (corresponding to $b_{IV}^2$) and the thousands place (corresponding to $b_{IV}^4$) the accumulator wheel has been moved from zero position. Therefore the setting of the printing device to zero is effected as follows in respect of the accumulator places within the number in which no movement from zero has occurred. Energization of the clutch magnets of the printing mechanism which correspond to "0" takes place through the contacts $w_{IV}$, $b_{IV}^4$, $b_{IV}^3$ to the clutch magnet $D^3$ and through the contacts $w_{IV}$, $b_{IV}^2$, $b_{IV}^1$ to the clutch magnet $D^1$. Accordingly the wiring has been so arranged that when the crank drive is positioned for value 1 (in the printing device), or position I, a current impulse will pass through $w_{IV}$, and $D^3$ and $D^1$ will be energized whereby the type wheels associated with these magnets will be set to "0."

No current can flow through $D^5$ and the clutch magnets of the higher places of the accumulator since the contact $b_{IV}^4$ has interrupted the line in this direction. Nor can any current flow through $D^4$ and $D^2$ since the line to these magnets is interrupted at the contacts $b_{IV}^4$ and $b_{IV}^2$ which have been shifted by their own accumulator place.

The setting up of the digits 3 and 5 is then effected by the next settings of the crank drive as has already been described.

Card feed

The card feed is effected by means of the two chains 227 (Figs. 14 and 33). The card is moved from the magazine 229 in a known manner by means of the knives 228. Both knives 228 are mounted on the slide 231 guided by the two pins 232. The movement of the slide 231 is effected by a crank drive. The crank 233 is fast upon the shaft 235 together with the chain wheel 234. The dimensions of the chain wheel have been chosen in such manner that one revolution of the chain wheel corresponds to the extent of feed for one card. The link 236 is connected through rod 237 to the crank 233. The upper end of the link is connected with the slide 231 and the lower end with rocker 238. The left hand end (Fig. 33) of the rocker 238 is pivotally mounted on the bracket 239. Fast on shaft 235 are also the two rollers 241 (Fig. 13). Two rolls 242 bear against the latter (Fig. 33), which rolls are pivotally mounted on the arms 243 the latter being in turn pivotally mounted on the brackets 244. The arms 243 or the rollers 242 are urged downwardly by means of the springs 245.

The card is fed by the knives 228 between the rollers 241 and the rolls 242 and is then advanced by the latter. The pressure of the rolls 242 has been so chosen that on a predetermined resistance of the card the rollers 241 will skid with respect to the card. The diameter of the rollers 241 is somewhat larger than the pitch circle diameter of the chain wheel whereby the feed through the rollers is effected somewhat faster than that by the chain. If the card is gripped by the rollers 241 and the rolls 242 it will run faster than the chain until its leading edge engages the noses 227a of the two chains 227. In this way any tendency of the card to deviate laterally will be compensated for right at the beginning. As soon as the rear edge of the card leaves the rollers 241 the next noses 227 will take over the feed. The distance between two noses corresponds exactly to the width of the card. The chain effects only the feed of the card. The card rests upon the bed 246 which serves at the same time as a chain guide (Figs. 14 and 33). Laterally the card is guided by the two bars 250. The two bars are fastened to the side walls of the machine. They serve at the same time as fastening means for the card feeding device and the analyzing means.

The card will at first pass below the first set of brushes 247 (Fig. 31) serving only for the group control. Then the card will pass under the second set of brushes 248 which will cause the analysis proper (Figs. 14, 31 and 33). Both sets of brushes are alike in their construction and are held between the two holders 249. The set of brushes 247 consists of twice 30 brushes 251 since both decks of the card are analyzed simultaneously. The brushes are tightly held by the plates 252 and are moreover guided in the combs 253. The brushes 251 bear on the contact plates 254 which are fastened by insulating plates 255 to the bars 256. The bars 256 are fastened to the bars 250 together with the combs 253 (Fig. 33).

As auxiliary feeding means there are provided for each set of brushes the rollers 257 and 258 which draw the card past the brushes. The rollers must have the same feeding speed as the chain. Since, however, the rollers have a larger diameter than the pitch circle diameter of the chain wheel the rollers must rotate more slowly which is effected by a gear. The rollers are rotatably mounted upon respective spindles 259 and 261. The spindle 261 is rigidly connected to the chain wheel 262 (Fig. 14). The spindle 259 is driven by the chain. Moreover, there is a rigid connection of the gear 263 to the chain wheel 262 and of gear 264 to the rollers. The gear 264 is driven by the gear 263 through a ratio gear including the gears 265 and 266. The spindles 259 and 261 (Fig. 31) as well as the ratio gear are mounted in the angles 260 (Figs. 14 and 33). The ratio has been chosen in such manner that the feed speed of the roller is the same as that of the chain. The card is pressed by rolls 267 and 268 towards the rollers 257 and 258. The rolls are fast upon the spindles 269 and 271 which are rotatably mounted in the holders 249. The holders 249 are rotatably mounted on the brackets 272 the latter being rigidly screwed to the bars 250 (Fig. 33). The springs 273 press the holders and brushes and the rolls 267 and 268 downwards.

On a card change the cards will be fed faster in order to prevent an unnecessary idle operation of the machine. In order to permit the rapid feed to be effected without jamming, the brushes are raised which is effected by rocking the holders 249 upwards (Fig. 32). Fast on shaft 261 is the cam disk 274. Since chain wheel 262 is fast on the shaft 261 the latter rotates once for each movement of the chain corresponding to one card advance.

The shape of the cam disk corresponds to the time sequence of the card analysis. The cam disk 274 can raise the lever 275. The latter is rigidly mounted on the shaft 276, as are the levers 277. The levers 277 engage beneath the shaft 271 and press the holder 249 upward. The shaft 276 is mounted in the brackets 278 which are screwed to the side wall 279. The shape of the cam has been chosen in such manner that the lever 275 is pressed upward when card change takes place or when the analysis has been completed.

The movement of the chain, or the card feed, is effected step by step. The step by step movement is so arranged that the card is moved slowly during the analysis, while the card change takes place rapidly. The rhythm of the card feed agrees with that of the crank drive. It is so sub-divided that six operating steps and three idle steps are necessary. In this case the same kind of drive may be used as has been described in connection with the crank drive.

The drive for the card feed is effected by the gear 67 serving in this instance as a crank. The rocker 281 is connected to the crank by means of link 282. The rocker 281 is pivotally mounted on the bolt 283 screwed to the angle 260. The pawls 284 and 285 are pivotally mounted on the rocker 281 and act on the ratchet wheels 286 and 287, both of which are fast on the shaft 261 (Figs. 34 and 35). The teeth on the ratchet wheels are not distributed around the whole circumference. They are distributed in such a way as to allow one pawl to continue the operation of the other. The pawl 284 and the ratchet wheel 286 serve for the rapid feed which occurs on a card change. Pawl 285 and ratchet wheel 287 take over the slow feed for analysis. While the one pawl is operating, the other one is sliding upon that part of the ratchet wheel circumference which does not have any teeth. Corresponding to the rapid feed the pawl 284 has a larger stroke and the ratchet wheel 286 a larger pitch, while the pawl 285 has a smaller stroke and the ratchet wheel 287 a smaller pitch corresponding to the slower feed. The difference in the stroke is obtained by providing the pawls on the rocker 281 with different lever arms. The exact determination of the position as well as locking against backward movement is effected by the detent wheel 288 and the detent spring 289 (Fig. 36). The detent wheel 288 is also fast on the shaft 261. The spring 289 is rigidly screwed to the side wall 279 and is adjustable by means of elongated holes so that the position of the card may be exactly determined. The teeth or the tooth spaces of detent wheel 288 are so arranged that they are distributed in accordance with the pawl feed. In order to prevent too much play during the rapid feed the stop 291 (Fig. 34) is provided which is screwed to the wall 279 together with the spring 289 and is also adjustable by means of elongated holes.

If the total is to be taken i. e. if the group control responds, the card feed must be interrupted. It is possible that the group control will respond immediately on analysis of the first hole position. However, the card feed must not be interrupted immediately but the card must be completely analyzed. This is effected by raising the pawl 284 for the rapid feed so that it cannot engage the ratchet wheel 286. However the analyzing pawl 285 will continue to feed until the termination of the analyzing period. Raising of the pawl 284 is effected by the lug 292a of the armature 292. The armature 292 is attracted by the magnet K. The armature is held and restored to its home position by the spring 294. Its home position is determined by the stop 295. The magnet K is fastened by its yoke 296 to the intermediate wall 97 (Fig. 14), however for reasons of clearness it is not shown in Fig. 14. If the group control relays G respond, which will be referred to later on in connection with the wiring, they will complete the current circuit through the magnet K which will raise the pawl 284 by means of the armature 292. However, the feed will then continue to be effected by the pawl 285 until the change-over in the operation of the pawls. If the armature 292 drops, the pawl 284 will drop on the ratchet wheel 286 and will advance the latter.

If the analysis of a card has been completed it is fed by the rollers 258 into the card receiver 297 having the card support 298. The card support is guided by rollers 299 on the wall 301 and is urged upwardly by the spring 302. When the support 301 reaches the lowermost position it will open the contact *ma* which will stop the machine.

*Plug board*

In the described embodiment it is possible to connect analyzing brushes, type wheels and the accumulators at will. Moreover, the group control relays may be plugged to any column of the card. The plugging is readily visible and the operation is simple. This is due to the fact that the wireless plugging has been used, as known in the art of communication.

There is a bar coordinated to each operating element which is to be selected, such as for instance as the brushes, accumulators and so on. The bars are arranged with respect to each other in such a manner that they cross the bars of the operating elements to which they are to be electrically connected. Bars crossing each other are arranged in different layers. Wherever there is a crossing there is a hole in the bars. The connections between the bars may be established by means of plugs by insertion of the plugs at the respective crossing points.

Figure 37:
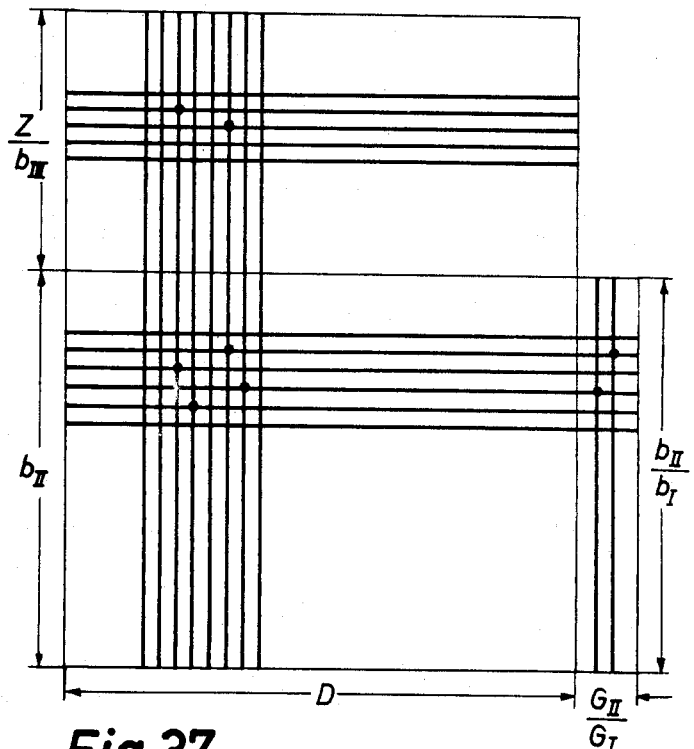
Fig. 37 shows diagrammatically the arrangement of the plug board in top view.
Figure 38:
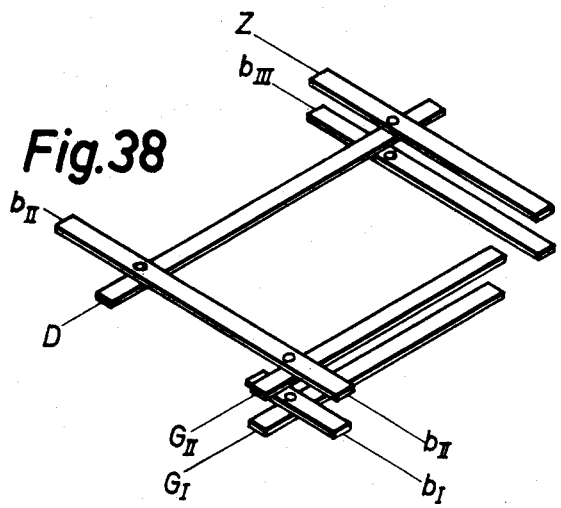
Fig. 38 shows diagrammatically the arrangement of the plug board in perspective illustration.

Fig. 37 shows diagrammatically the division into the various groups and Fig. 38 shows the layers of the groups. The clutch magnets of the printing mechanism are connected to the range D of the bars, the brushes of the set of brushes 248 to the range $b_{II}$, the brushes of the brush set 147 to $b_I$. The layers $b_I$ and $b_{II}$ are arranged above each other as may also be seen from Fig. 38. The two layers for the two terminals of the group control relays are within the range $G_I$ and $G_{II}$. There are provided in this machine six group control relays. The clutch magnets for the accumulator places as well as the analyzing device for the accumulator adjustments are connected to the range Z and $b_{III}$ of the bars.

The actual construction of the plug board is shown in Figs. 39 to 41. Fig. 39 shows the plug board within the range D by $b_{II}$. Fig. 40 shows the arrangement of the various layers in top view. Fig. 41 shows the stratification of the field D by $Z/b_{III}$. Fig. 42 shows the stratification of the field $G_I/G_{II}$ by $b_I/b_{II}$. Stratification of the bars is provided between the insulating plates 305.

Only two bars are arranged below each other on each crossing point within the range D by $b_{II}$ so that a simple plug 306 will be sufficient. In the range $G_I/G_{II}$ by $b_I/b_{II}$ two groups are connected. On the one hand $b_I$ is connected to the terminal $G_I$ and on the other hand $b_{II}$ to the terminal $G_{II}$ of the group control relay. In this instance the double plug 307 is necessary in which the two connection pins are insulated from one another. A selective connection from D by Z and D by $b_{III}$ is possible in the range D by $Z/b_{III}$. For the first mentioned connection the short plug 306 is sufficient while for the second connection the plug 308 must be used. The latter is insulated in its upper part so that no contact can be established through Z.

In this type of wireless plugging combining of several operating elements with each other or their parallel wiring is possible by plugging several bars on one bar. Here the variety of combinations and the possibility of application can however not be referred to. It is dependent upon the particular requirements with which the machine is to comply. The plug board (Figs. 14 and 33) generally indicated at 304 is easily accessible above the machine and is covered by a cap 309.

*Circuit diagram*

In the illustration of the circuit diagram for the tabulating machine a simplified method has been chosen, as is generally used in the art of communication. If several identical units are provided, such as clutch magnets and brushes, only one of them is shown in the diagram while the remainder is indicated by the distribution connections only. The number of the units is indicated by the Arabic index number. The relays and magnets are indicated by capitals and the contacts which they actuate by the corresponding small letters. Manually actuated contacts are characterized by a key-like hook on the upper end of the contact member. Generally, the convention is such that the characters are situated to the right of the associated magnets, relays and contacts or above the wiring symbol respectively as far as they do not affect clarity. The contacts are shown in the positions which they occupy when the machine is at rest.

The wiring may be seen from Fig. 43. In order to facilitate reading of the wiring diagram, the relay or cam diagram (Fig. 44) is also shown. It indicates the responding or closing times of the relays and contacts, depending on the operating cycle of the machine for the described example, that, after a card, a total taking operation takes place and after that the first card of a new group follows. The unit of the operating cycle is one revolution of the crank 11 of the crank drive. This unit corresponds to the analysis of a single row of hole positions of the card. As previously indicated one card cycle comprises 9 of such units which means 9 operating cycles. If the main switch of the machine is closed the machine will not yet start to run. It is only when the start key "*an*" is depressed that the motor M will receive current from negative through the start key "*an*" and the magazine contact *ma*. The motor will start running and will feed cards to the set of brushes. At the same time the motor starts to rotate the cam disks for the cam contacts *w* (Figs. 13, 45 to 47). The latter will, however, be ineffective as long as the usual card lever has not been reached by the cards. The arrangement of card lever contacts is known and for reasons of clearness has therefore been omitted in the drawings. As soon as the first card has reached the second set of brushes 248 (Fig. 31) the card lever associated with said set of brushes will be actuated and will close its contacts $ka_I$ and $ka_{II}$. When the latter are closed the start key can be released again.

The cam contacts are geenrally designated by *w* and are distinguished by Roman indices. They operate in the rhythm of the card cycle. The movement of the cams may therefore be derived from the gear wheel 187 (Fig. 13) which rotates once in each card cycle. The cams are mounted upon the shaft 312 and are fast to the gear 311 meshing with the toothed wheel 187. The contacts *w* are fastened on a stirrup 313. For the various contacts $w_I$ to $w_V$ three different cams are provided which are shown in Figs. 45 to 47. The period of actuation of the contacts with regard to the card cycle may be seen from the relay diagram. Moreover an impulse contact *i* (Fig. 10) is provided which is actuated by the cam 11a on the crank 11 of the crank drive. It emits the impulses for the clutch magnets Z and D. The position of the cams 11a has been chosen in such a manner that the contact *i* will always emit an impulse to the clutch magnet if the crank drive has reached the dead point for clutch engagement as has already been described. At the beginning of the analysis (operating cycle 1, Fig. 44) the contacts $w_I$ and *i* are shifted so that current may flow from negative through the contacts $ka_{II}$, *ma*, $ka_I$, $w_I$, *i*, $h_I$, the brushes $b_{II}$ through the plug board indicated symbolically by a circle in dotted lines, through the magnet D to positive. In accordance with the holes in the card the magnets D will be energized and will clutch the type wheels. At the same time current can flow from $b_{II}$ through the plug board, the contact $g_I$ through the left hand winding of the group control relay G to positive. If the group number of the next card agrees with that of the card which has just been analyzed current will also flow from contact $h_I$ through the first set of brushes $b_I$, the contact $g_{II}$, the plug board, through the right hand coil of the relay G to positive. The group control relay G is constructed as a differential relay and will not respond if current flows through both windings. Before the advance to the next hole position the contact $i$ has again returned to its home position. The card will be advanced, $i$ will again be shifted and the above described current paths will be closed again in accordance with the perforations in the columns of the next hole position. Upon analysis of position II the contact $w_{III}$ will be closed by its cam so that now the clutch impulse may also flow through the clutch magnets Z of the accumulators. Since, of course, the group numbers will not be added those brushes are concerned that are connected to the amount columns and therefore to the printing device and accumulator, but not to the group control. This operating cycle will be repeated with the contact $w_{III}$ remaining closed until the position V inclusive. Upon analysis of the position VI, $w_{III}$ has already opened again and prevents the passage of impulses through the accumulator magnets; which was also prevented at position I. After analysis of position VI the cam contact $w_I$ will again return to its rest position so that in the next following three idle operating cycles the current circuit to the magnets D, Z and G will remain interrupted upon card change. On analysis of the next card the same operations will be repeated.

If now the group number of the subsequent card does not agree with the preceding one, either the brush $b_I$ or $b_{II}$ will be interrupted by the card. Now current will flow over one winding of the differential relay G so that the latter will respond and will actuate its contacts $g_I$ to $g_{IV}$ the purpose of which will be explained later. The contact $g_I$ has been shifted. Therefore current will flow from negative through the contacts $k_{aII}$, $ma$, $g_I$ through the left hand coil of relay G to positive. At the same time also the contact $g_{II}$ has shifted, no current can however flow through the right hand winding since its passage is interrupted at contact $w_{II}$. Therefore the group control relay G will remain energised though the card is still being advanced. Further the contacts $g_{III}$ have closed the current circuit through the declutching magnet K so that the latter will respond and will interrupt the card feed. Arresting of the card, however, takes place only at the end of the analysis as has already been described.

Due to the energization of the magnet K its contact $k$ has been closed. If now the contact $w_I$ returns again to its home position at the end of the analysis of a card the current circuit through the auxiliary relay H will be closed which will respond and will actuate its contacts $h_I$ to $h_{IV}$. By means of its contacts the relay H prepares machine for total taking. At the beginning of the next card cycle, which is used for the analysis of the accumulator and during which the card advance is interrupted and the card analysis is disconnected from the current supply at contact $h_I$, the $w_I$ contact will again be shifted. The relay H, however, does not drop since through the $h_{IV}$-contact a holding circuit has been closed. It is true that the $h_I$ contact has disconnected the analyzing brushes $b_I$ and $b_{II}$ but it has connected the contacts $b_{III}$ and $b_{IV}$ serving for the analysis of the accumulators. The contact $b_{IV}$ serves, as has already been described for the suppression of the zero-printing above the highest significant figure. For reasons of clearness the analysis of the accumulator by the springs 205 has been concentrated in contact $b_{III}$. When the crank drive is in position I the $w_I$ contact, the $i$ contact and the $h_I$ contact have been shifted and the $w_{IV}$ contact has closed so that, if the $w_{IV}$ contact has been shifted the zero impulse is transmitted to the printing magnets D of the next accumulator places as has already been described. On the advance to the next hole position in the meantime the $w_{IV}$ contact has opened again so that now the current impulse will flow through the contacts $h_I$, $b_{III}$, the plug board, through the magnet D to positive. No current can flow through magnet Z since this current circuit is interrupted by contact $h_{II}$.

The step by step shifting for the analysis of the accumulators is effected by the magnet A. It will receive its impulses through the impulse contact $i$ and the closed contact $h_{III}$. At the beginning of the analysis of the accumulator the cam contact $w_V$ will close so that current can flow from negative through $k_{aII}$, $ma$, $h_{IV}$, $w_V$, $g_{IV}$ through the reset magnet N to positive. The latter will respond and will release the one revolution clutch for zeroizing. As already described the zeroizing proper will however take place only after the analysis of the accumulator has been completed. The analysis of the accumulator being finished, the contacts $w_I$ and $w_V$ will again return to their home position, thereby interrupting the current circuit through the reset magnet N and the magnet A and causing the same to drop. Shortly thereafter the contact $w_{II}$ will close so that current flows through the contacts $h_{IV}$, $w_{II}$, $g_{II}$, the plug board, through the right hand winding of the differential relay G to positive. Current will now flow through both windings of the differential relay so that the relay will drop and the contacts $g$ will again return to their rest position. Thereby also the current circuit through the clutch magnet K will be interrupted through contact $g_{III}$ so that the magnet will drop, and by means of its contact $k$ interrupts the circuit through the auxiliary relay H thus causing the relay also to drop and by means of its contacts $h$, to prepare the machine again for the analysis of the next card.

If the card receiver is filled with cards the support 298 will open the contact $ma$, whereby the entire current circuit through the machine will be interrupted thus causing the latter to stop. Stopping will also occur if no more cards are fed, in which case the card lever returns to its home position so that both contacts $k_{aI}$ and $k_{aII}$ are opened.

Subtraction

The idea according to the invention may be applied to subtraction by complementary addition just as well as to adding operations. Since for this purpose merely the appropriate application of known means in connection with the devices described heretofore is required it is not necessary to describe the subtraction in detail.

It is well known that a number can be subtracted by adding its complement. According to this method most of the tabulating machines now in use operate according to this method. In applying the present invention to subtraction it is merely necessary to choose a perforation code wherein the non-perforated positions are always the nines complement of the perforated positions of a number. Since the manner of operation according to the invention may be carried out with any additive hole combination code and if necessary the accumulator mechanism may be driven by means of an individual crank drive according to a law different from that according to which the printing mechanism operates, there is nothing to prevent the adaptation of the invention to the hole code required. However, the device for the analysis of the accumulator setting must then be adapted to the values of the numerical code in such a way as to agree with the application of said code to the printing mechanism. If in a suitably chosen hole code either the punched positions (in the case of a positive item) or the non-punched positions (in the case of a negative item) become effective for the control (which is made possible by operation with working or rest current) then in the case of a negative item its complementary value will be added.

The selection of the true or the complementary value for entry is effected in a known manner by a control hole, designating the value as negative. In a known manner also the entering of the fugitive unit as well as the determination of the positive or negative character of the balance may be taken into consideration.

From the foregoing brief reference it will readily follow that subtraction by means of complementary values, which is in fact only an adding operation can also be carried out by means of the invention.

I claim:

1. In a machine controlled by records having index marks in predetermined index positions of a record column, each index position having a predetermined value associated therewith, means for analyzing said index positions of a record column one by one, registering means, reciprocating driving means for said registering means, said driving means performing a single driving stroke upon the analysis of each index position, means for automatically varying the driving action in each driving stroke in accordance with the values associated with the index positions, and clutching means for operatively connecting said driving means upon a driving stroke to said registering means, said clutching means being under the control of said analyzing means and being rendered effective upon the analysis of an index mark.

2. In a machine controlled by records having a plurality of record columns with index marks in predetermined index positions of said columns, each index position having a predetermined value associated therewith, means for analyzing the index positions of each column one by one and for analyzing all columns simultaneously, a plurality of registering elements, one element being associated with a record column, reciprocating driving means for said registering elements, said driving means performing a single driving stroke upon the analysis of each index position, means common to the driving means for all registering elements for automatically varying the driving action in each driving stroke in accordance with the values associated with the index positions, and clutching means individually associated with each registering element for operatively connecting said driving means upon a driving stroke to the associated registering elements, said clutching means being under the control of said analyzing means for a record column and being rendered effective upon the analysis of an index mark.

3. In a machine controlled by records having index marks in predetermined index positions of a record column, each index position having a predetermined value associated therewith, means for analyzing said index positions of a record column one by one, registering means, reciprocating driving means for said registering means, said reciprocating driving means performing a single driving stroke upon the analysis of each index position, means for automatically varying the extent of said driving stroke in accordance with the values associated with the index positions, and clutching means for operatively connecting said driving means at one dead centre position of the latter to said registering means, said clutching means being under the control of said analyzing means and being rendered effective upon the analysis of an index mark and being automatically unclutched by the reverse movement of said driving means at the other dead centre position of the latter independent of the extent of said driving stroke.

4. In a machine controlled by records having a plurality of record columns with index marks in predetermined index positions of said columns, each index position having a predetermined value associated therewith, means for analyzing the index positions of each column one by one and for analyzing all columns simultaneously, a plurality of registering elements, one element being associated with a record column, reciprocating driving means for said registering elements, said reciprocating driving means performing a single driving stroke upon the analysis of each index position, means common to the driving means for all registering elements for automatically varying the extent of said driving stroke in accordance with the values associated with the index positions, and clutching means individually associated with each registering element for operatively connecting said driving means at one dead centre position of the latter to the associated registering element, said clutching means being under the control of said analyzing means for a record column and being rendered effective upon the analysis of an index mark and being automatically unclutched by the reverse movement of said driving means at the other dead centre position of the latter independent of the extent of said driving stroke.

5. In a machine controlled by records having a plurality of record columns with index marks in predetermined index positions of said columns, each index position having a predetermined value associated therewith, analyzing means common to all index positions of a record column for analyzing the index positions of each column one by one, a registering element associated with each record column, reciprocating driving means for each registering element performing a single driving stroke upon the analysis of each index position, means common to the driving means for all registering elements for automatically varying the driving action in each driving stroke in accordance with the values associated with the index positions, and clutching means for each registering element, said clutching means being common to all index positions of a record column for operatively connecting said driving means at the beginning of a driving stroke to the associated registering element, and being under the control of said analyzing means for a record column.

6. In a machine controlled by records having index marks in predetermined index positions of a record column, each index position having a predetermined value associated therewith, means for analyzing said index positions of a record column one by one, registering means, reciprocating driving means for said registering means, said driving means performing upon the analysis of each index position a single driving stroke from the same home position, means for automatically varying the extent of the driving stroke from the home position in accordance with the values associated with the index positions, and clutching means provided in the home position of said driving means for operatively connecting said driving means before the driving stroke to said registering means, said clutching means being under the control of said analyzing means and being rendered effective upon the analysis of an index mark if said reciprocating driving means are in home position.

7. In a machine controlled by records having index marks in predetermined index positions of a record column, each index position having a predetermined value associated therewith, means for analyzing said index positions of a record column one by one, registering means, driving means for said registering means, said driving means including a rocking lever performing a single driving stroke upon the analysis of each index position, means for automatically varying the active extent of said driving stroke upon said registering means upon analysis of each index position in accordance with the values associated with said index positions, and clutching means for operatively connecting said driving means to said registering means under the control of an index mark.

8. In a machine controlled by records having index marks in predetermined index positions of a record column, each index position having a predetermined value associated therewith, means for analyzing said index positions of a record column one by one, registering means, reciprocating driving means for said registering means, said driving means including a crank drive performing a single driving stroke upon the analysis of each index position, means coacting with said crank drive for automatically varying the extent of the driving stroke in accordance with the values associated with the index positions, and clutching means for operatively connecting said driving means upon a driving stroke to said registering means, said clutching means being under the control of said analyzing means and being rendered effective upon the analysis of an index mark.

9. In a machine as specified in claim 8 wherein said driving stroke varying means include also a crank drive automatically set to different positions with respect to said first crank drive upon the subsequent analysis of the index positions of a record column.

10. In a machine controlled by records having a plurality of record columns with index marks in predetermined index positions of said columns position having a predetermined value associated therewith, analyzing means common to all index positions or a record column for analyzing said index positions one by one, registering means, driving means for said registering means, said driving means including a double arm lever rockable about a pivot between its ends and being driven at one of its ends and actuating by its other end the driving means for said registering means, said lever being common to all driving means for the registering means, means for automatically varying the pivot of said double arm lever upon the subsequent analysis of the index positions of a record column so that the relative movements of the driving end of said lever correspond to the values associated with the index positions of a record column, and clutching means for operatively connecting said driving means to said registering means under the control of an index mark.

11. In a machine controlled by records having a plurality of record columns with index marks in predetermined index positions of said columns position having a predetermined value associated therewith, analyzing means common to all index positions of a record column for analyzing said index positions one by one, registering means, reciprocating driving means for said registering means, said driving means performing a single driving stroke upon the analysis of each index position, means for automatically varying the extent of said driving stroke in accordance with the values associated with the index positions of a record column, the registering means in said machine consisting of a number of registering wheels, each registering wheel being operatively connected to a ratchet wheel, means for locking said registering wheels against backward movement, a driving ring mounted on each ratchet wheel, said driving rings being operatively connected to said reciprocating driving means thus performing a back and forth rotation in accordance with the variation of the driving stroke, a clutch pawl on said driving ring being normally held under spring action disengaged from said ratchet wheel and being held by said spring action in engagement with said ratchet wheel in the clutching position, a clutch magnet adapted to rock said pawl in clutching position upon analysis of an index mark and against the action of said spring, said pawl being disengaged from said ratchet wheel upon backward movement of said driving ring.

12. In a tabulating machine controlled by records having index marks in predetermined index positions of a record column, each index position having a predetermined value associated therewith, means for analyzing said index positions of a record column one by one, accumulating means and printing means, reciprocating driving means for said accumulating and said printing means, said driving means performing a single driving stroke upon the analysis of each index position, means common to both the accumulating and the printing means for automatically varying the driving action in each driving stroke in accordance with the values associated with the index positions, and separate clutching means for the accumulating and the printing means for operatively connecting said driving means upon the driving stroke to said accumulating and printing means, said clutching means being under the control of said analyzing means and being rendered effective upon the analysis of an index mark.

13. In a machine as specified in claim 12 having gearing means between the driving means for the accumulating means and the driving action varying means as well as gearing means between the driving means for the printing means and the driving action varying means, the two gearing means having a different ratio.

14. In a tabulating machine controlled by record cards having index marks in predetermined index positions of a record column, each index position having a predetermined value associated therewith, card controlled accumulating means, printing means, total taking means setting said printing means under accumulator control upon total taking, means for analyzing said index positions of a record column one by one, reciprocating driving means for said accumulator and printing means, said driving means performing a single driving stroke upon the analysis of each index position, means for automatically varying the driving action in each driving stroke in accordance with the values associated with the index positions, clutching means on said accumulator and printing mechanisms for operatively connecting said driving means upon each driving stroke to said registering means, said clutching means being under the control of said analyzing means and being rendered effective upon the analysis of an index mark, and means for connecting in the total taking operation the driving means for the printing mechanism to the driving action varying means, means on said accumulator representing the setting of the latter in accordance with the code of the index marks, and means for analyzing the accumulator setting and controlling in accordance with this setting the clutching means of said printing mechanism upon the subsequent reciprocating driving action of the driving means.

15. In a machine controlled by records having index marks in predetermined index positions of a record column, each index position having a predetermined value associated therewith, means for analyzing said index positions of a record column one by one, registering means, driving means for said registering means and means for imparting to said driving means upon the analysis of each index position a single driving movement departing from a dead centre position and moving over a maximum again to a dead centre position, means for automatically varying the extent of said driving movement upon the analysis of each index position in accordance with the values associated with the index positions, clutching means for operatively connecting said driving means in one dead centre position to said registering means, said clutching means being under the control of said analyzing means and being rendered effective upon the analysis of an index mark, and means for automatically unclutching said registering means from said driving means in the other dead centre position of said driving means.

16. In a machine controlled by records having index marks in predetermined index positions of a record column, each index position having a predetermined value associated therewith, means for analyzing said index positions of a record column one by one, registering means, driving means for said registering means and means for imparting to said driving means upon the analysis of each index position a single driving movement departing from a dead centre position and moving over a maximum again to a dead centre position, means for automatically varying the extent of said driving movement upon the analysis of each index position in accordance with the values associated with the index positions, clutching means for operatively connecting said driving means in one dead centre position to said registering means, said clutching means being common to all index positions and being rendered effective upon the analysis of an index mark, and means for automatically unclutching said registering means from said driving means in the other dead centre position of said driving means independent of the extent of the driving movement.

17. In a machine controlled by records having index marks in predetermined index positions of a record column, each index position having a predetermined value associated therewith, means for analyzing said index positions of a record column one by one, registering means, driving means for said registering means, said driving means performing a single driving movement upon the analysis of each index position, means for automatically varying the extent of the driving movement in each driving movement in accordance with the values associated with the index positions, and clutching means common to all index positions of a record column for operatively connecting said driving means upon a driving movement to said registering means, said clutching means being under the control of said analyzing means and being rendered effective upon the analysis of an index mark.

18. In a machine controlled by records having a plurality of record columns with index marks in predetermined index positions of said columns, each index position having a predetermined value associated therewith, means for analyzing the index positions of each column one by one and for analyzing all columns simultaneously, a plurality of registering elements, one element being associated with a record column, driving means for said registering elements, said driving means performing a single driving movement upon the analysis of each index position, means common to the driving means for all registering elements for automatically varying the extent of the driving movement in each driving movement in accordance with the values associated with the index positions and clutching means individually associated with each registering element and common to all index positions of a record column for operatively connecting said driving means upon a driving movement to the associated registering elements, said clutching means being under the control of said analyzing means for a record column and being rendered effective upon the analysis of an index mark.

19. In a tabulating machine controlled by records having index marks in predetermined index positions of a record column, each index position having a predetermined value associated therewith, means for analyzing said index positions of a record column one by one, accumulating means and printing means, driving means for said accumulating and said printing means, said driving means performing a single driving movement upon the analysis of each index position, means common to both the accumulating and the printing means for automatically varying the extent of the driving movement in each driving movement in accordance with the values associated with the index positions, and separate clutching means for the accumulating and the printing means for operatively connecting said driving means upon the driving movement to said accumulating and printing means, said clutching means in each of said accumulating and said printing means being common to all index positions of a column and being rendered effective upon the analysis of an index mark.

20. In a tabulating machine controlled by record cards having index marks in predetermined index positions of a record column, each index position having a predetermined value associated therewith, card controlled accumulating means, printing means, total taking means setting said printing means under accumulator control upon total taking, means for analyzing said index positions of a record column one by one, driving means for said accumulator and printing means, said driving means performing a single driving movement upon the analysis of each index position, means for automatically varying the extent of the driving movement in each driving movement in accordance with the values associated with the index positions, clutching means on said accumulator and printing mechanisms for operatively connecting said driving means upon each driving movement to said registering means, said clutching means in each of the accumulator and printing mechanisms being common to all index positions of a record column and being rendered effective under the control of said analyzing means upon the analysis of an index mark, and means for connecting in the total taking operation the driving means for the printing mechanism to the driving movement varying means, means on said accumulator representing the setting of the latter in accordance with the code of the index marks, and means for analyzing the accumulator setting and controlling in accordance with this setting the clutching means of said printing mechanism upon the subsequent driving movements of the driving means.

No references cited.